United States Patent
Yamashita et al.

(10) Patent No.: US 10,040,910 B2
(45) Date of Patent: Aug. 7, 2018

(54) POLYPHENYLENE SULFIDE BLOCK COPOLYMER, METHOD FOR MANUFACTURING SAME, AND METHOD FOR MANUFACTURING POLYPHENYLENE SULFIDE POROUS BODY

(71) Applicant: TORAY INDUSTRIES, INC., Tokyo (JP)

(72) Inventors: Kohei Yamashita, Nagoya (JP); Takeshi Unohara, Nagoya (JP); Kosaku Takeuchi, Otsu (JP); Daisuke Yamamoto, Nagoya (JP); Koji Yamauchi, Nagoya (JP)

(73) Assignee: TORAY INDUSTRIES, INC., Tokyo (JP)

(*) Notice: Subject to any disclaimer, the term of this patent is extended or adjusted under 35 U.S.C. 154(b) by 0 days.

(21) Appl. No.: 15/107,705

(22) PCT Filed: Dec. 24, 2014

(86) PCT No.: PCT/JP2014/084051
§ 371 (c)(1),
(2) Date: Jun. 23, 2016

(87) PCT Pub. No.: WO2015/098916
PCT Pub. Date: Jul. 2, 2015

(65) Prior Publication Data
US 2016/0319082 A1    Nov. 3, 2016

(30) Foreign Application Priority Data

Dec. 25, 2013 (JP) .................. 2013-267096
Feb. 28, 2014 (JP) .................. 2014-038602
Mar. 28, 2014 (JP) .................. 2014-067701

(51) Int. Cl.
| | |
|---|---|
| C08J 9/26 | (2006.01) |
| C08G 81/00 | (2006.01) |
| C08L 81/04 | (2006.01) |
| C08G 75/0204 | (2016.01) |
| C08G 75/0259 | (2016.01) |
| C08G 75/0286 | (2016.01) |

(52) U.S. Cl.
CPC ......... *C08G 81/00* (2013.01); *C08G 75/0204* (2013.01); *C08G 75/0259* (2013.01); *C08G 75/0286* (2013.01); *C08J 9/26* (2013.01); *C08L 81/04* (2013.01); *C08J 2201/046* (2013.01); *C08J 2381/02* (2013.01); *C08J 2381/04* (2013.01)

(58) Field of Classification Search
CPC .. C08G 75/14; C08G 75/025; C08G 75/0281; C08J 2381/04; C08J 3/12; C08F 6/28
USPC ........................................................ 525/537
See application file for complete search history.

(56) References Cited

U.S. PATENT DOCUMENTS

| | | | |
|---|---|---|---|
| 5,262,517 A | 11/1993 | Sato | |
| 5,331,029 A | 7/1994 | Sato | |
| 6,080,822 A | 6/2000 | Haubs | |
| 2013/0225771 A1* | 8/2013 | Kanomata | .............. C08G 75/14 525/537 |

FOREIGN PATENT DOCUMENTS

| | | |
|---|---|---|
| JP | 03250024 | 11/1991 |
| JP | 04311725 | 11/1992 |
| JP | 05295346 | 11/1993 |
| JP | 11222527 | 8/1999 |
| JP | 2004182753 | 7/2004 |
| JP | 2010100806 | 5/2010 |
| JP | 2010254943 | 11/2010 |
| WO | 2012057319 | 5/2012 |
| WO | 2014136448 | 9/2014 |

OTHER PUBLICATIONS

International Search Report and Written Opinion of the International Search Authority issued in related International Application No. PCT/JP2014/084051, dated Apr. 14, 2015.
Gopakumar et al., "Block, copolymers of telechelic poly(phenylene sulfide) and semiaromatic thermotropic liquid crystalline polyester segments", Journal of Polymer Science, Part A: Polymer Chemistry, 1998, vol. 36, No. 15. (Abstract Only) 1998.

* cited by examiner

*Primary Examiner* — Shane Fang
(74) *Attorney, Agent, or Firm* — RatnerPrestia

(57) ABSTRACT

A heat-resistant, chemical-resistant polyphenylene sulfide block copolymer containing polyphenylene sulfide units and aromatic polyester units, wherein the polyphenylene sulfide units have a number average molecular weight in the range of 6,000 to 100,000. Provided is a polyphenylene sulfide block copolymer that overcomes the disadvantages of block copolymers including a low-molecular-weight polyphenylene sulfide segment and having poor heat resistance and chemical resistance.

10 Claims, No Drawings

POLYPHENYLENE SULFIDE BLOCK COPOLYMER, METHOD FOR MANUFACTURING SAME, AND METHOD FOR MANUFACTURING POLYPHENYLENE SULFIDE POROUS BODY

CROSS REFERENCE TO RELATED APPLICATIONS

This is the U.S. National Phase application of PCT International Application No. PCT/JP2014/084051, filed Dec. 24, 2014, and claims priority to Japanese Patent Application No. 2013-267096, filed Dec. 25, 2013, Japanese Patent Application No. 2014-038602, filed Feb. 28, 2014 and Japanese Patent Application No. 2014-067701, filed Mar. 28, 2014, the disclosures of each of these applications being incorporated herein by reference in their entireties for all purposes.

FIELD OF THE INVENTION

The present invention relates to polyphenylene sulfide block copolymers, methods for producing such copolymers, and methods for producing polyphenylene sulfide porous media. In particular, the invention relates to a polyphenylene sulfide block copolymer having excellent heat resistance and chemical resistance, wherein the polyphenylene sulfide units have a number average molecular weight (Mn) of 6,000 or more.

BACKGROUND OF THE INVENTION

Polyarylene sulfides are resins having properties suitable for engineering plastics, such as excellent heat resistance, barrier properties, chemical resistance, electrical insulating properties, moist-heat resistance, and flame resistance. In particular, polyphenylene sulfide resins can be molded by injection molding and extrusion molding into various molded parts such as films, sheets, and fibers and have been widely used in the fields of various electrical and electronic components, machine parts, automotive parts, and other parts requiring heat resistance and chemical resistance.

Polyphenylene sulfide resins, however, are inferior to other engineering plastics in shock resistance, toughness, and molding processability, and to improve these properties, combination with a different polymer has been attempted. Typical methods of the combination include blending a polyphenylene sulfide with any other different polymer to form a polymer alloy and chemically bonding with a different polymer to form a block copolymer. Of these, block copolymerization, as compared with other combination methods, enables the formation of uniform and fine phase-separated structures and has hitherto been extensively studied as a technique for modifying polyphenylene sulfides.

PATENT DOCUMENTS

As a method of producing a block copolymer of a polyphenylene sulfide and an aromatic polyester, there has been reported, for example, a transesterification reaction between a carboxylated arylene thioether oligomer and an aromatic polyester (see, for example, Patent Documents 1 and 2).

There has also been reported the use of a polyethylene terephthalate/oxybenzoate copolymer as an aromatic polyester (see, for example, Non Patent Document 1).

Furthermore, as another method of producing a block copolymer, there has been reported a reaction between a polyarylene sulfide and an aromatic polyester with stirring under heating conditions in a solvent capable of these compounds (see, for example, Patent Document 3).

Patent Document 1: JP 04-311725 A
Patent Document 2: JP 05-295346 A
Patent Document 3: JP 2004-182753 A

NON PATENT DOCUMENT

Non Patent Document 1: Journal of Polymer Science: Part A: Polymer Chemistry, Vol. 36, 2707-2713 (1998)

SUMMARY OF THE INVENTION

Block copolymers produced by the methods of Patent Document 1 and Patent Document 2, however, do not have the characteristics of polyphenylene sulfide, such as heat resistance and chemical resistance, because polyphenylene sulfide oligomers are used as materials for synthesizing the polyphenylene sulfide block copolymers, and the chain length per unit of polyphenylene sulfide segment in each block copolymer is short.

Block copolymers produced by the method of Non Patent Document 1, which describes that the polyphenylene sulfide used for blocking is a carboxylated polyphenylene sulfide oligomer having a repeat number n of 6, 9, or 12, also do not have the characteristics of polyphenylene sulfide, such as heat resistance and chemical resistance.

Aromatic polyesters that can be used in the method of Patent Document 3 are limited to specific aromatic polyesters having glass transition temperatures of 150° C. or higher and prepared using aromatic diol components having two or more aromatic rings. In addition, it has been reported that the reaction mechanism is such that radical species having polyarylene sulfide units or aromatic polyester units are generated by heating, resulting in depolymerization of the polymers and recombination of different radicals. Due to the generation of radical species, cross-linking reaction and, furthermore, depolymerization have proceeded in the resulting block copolymer. Thus, block copolymers produced by this method also do not have the characteristics of polyphenylene sulfide.

It is an object of the present invention is to provide a novel polyphenylene sulfide block copolymer that overcomes the disadvantages of polyphenylene sulfide block copolymers produced by the related art: low molecular weights of polyphenylene sulfide segments constituting block copolymers, and poor heat resistance and chemical resistance.

To solve these problems, the polyphenylene sulfide block copolymer of the present invention includes the following aspects:

A polyphenylene sulfide block copolymer containing polyphenylene sulfide units represented by Formula (I) and aromatic polyester units represented by Formula (II), wherein the polyphenylene sulfide units have a number average molecular weight (Mn) in the range of 6,000 to 100,000.

[Formula 1]

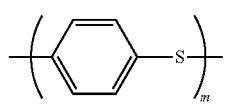

(I)

-continued

[Formula 2]

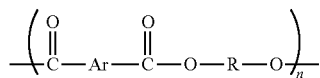
(II)

In Formula (II), Ar represents an optionally substituted arylene group of 6 to 20 carbon atoms, and R represents a divalent aliphatic hydrocarbon group of 1 to 10 carbon atoms.

An embodiment of a method of producing the polyphenylene sulfide block copolymer of the present invention has the following structure: A method of producing the above polyphenylene sulfide block copolymer, including heating a polyphenylene sulfide (A) containing the polyphenylene sulfide represented by Formula (I) as a repeating structure and an aromatic polyester (B) containing the polyester represented by Formula (II) as a repeating structure.

An embodiment of a method of producing a polyphenylene sulfide porous media according to the present invention has the following structure: A method of producing a polyphenylene sulfide porous media including decomposing and removing the aromatic polyester (B) from the above polyphenylene sulfide block copolymer or a polyphenylene sulfide block copolymer produced by the above production method.

In the polyphenylene sulfide block copolymer of the present invention, the aromatic polyester units are preferably polyethylene terephthalate units.

In the method of producing the polyphenylene sulfide block copolymer of the present invention, the polyphenylene sulfide (A) is preferably a polyphenylene sulfide represented by the following Formula (III) having a reactive end structure Z, and the reactive end structure Z is preferably a reactive functional group end structure selected from amino, carboxyl, hydroxyl, acid anhydride, isocyanate, epoxy, silanol, and alkoxysilane groups, and derivatives thereof.

[Formula 3]

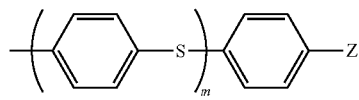
(III)

In the method of producing the polyphenylene sulfide block copolymer of the present invention, the polyphenylene sulfide (A) is preferably a polyphenylene sulfide produced by heating a cyclic polyphenylene sulfide (a) in the presence of a sulfide compound having reactive functional groups represented by the following Formula (IV) in an amount of 0.01 mol % to 25 mol % per mole of phenylene sulfide structural units.

[Formula 4]

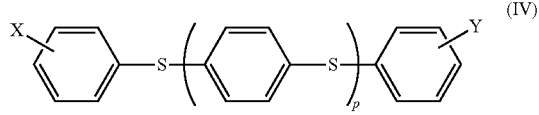
(IV)

In Formula (IV), at least one of X and Y is a functional group selected from amino, carboxyl, hydroxyl, acid anhydride, isocyanate, epoxy, silanol, and alkoxysilane groups, and derivatives thereof, and p represents an integer of 0 to 20, provided that p may be a single integer or a combination of different integers.

In the method of producing the polyphenylene sulfide block copolymer of the present invention, the cyclic polyphenylene sulfide (a) is preferably a monomer or mixture containing 50% by weight or more of a cyclic polyphenylene sulfide represented by the following Formula (V) wherein i is from 4 to 50.

[Formula 5]

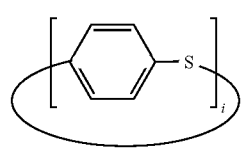
(V)

In the method of producing the polyphenylene sulfide block copolymer of the present invention, the polyphenylene sulfide (A) is preferably a polyphenylene sulfide produced by heating a mixture containing at least the cyclic polyphenylene sulfide (a) and the sulfide compound having reactive functional groups in the absence of a solvent.

In the method of producing the polyphenylene sulfide block copolymer of the present invention, the reactive functional groups in the sulfide compound having reactive functional groups are preferably functional groups selected from amino, carboxyl, and hydroxyl groups.

In the method of producing the polyphenylene sulfide block copolymer of the present invention, the polyphenylene sulfide (A) is preferably a polyphenylene sulfide produced by heating a mixture containing at least (i) a sulfidizing agent, (ii) a dihalogenated aromatic compound, (iii) an organic polar solvent, and (iv) a monohalogenated compound having a reactive functional group W represented by the following Formula (VI), the amount of the monohalogenated compound being 0.01 to 10 mol % per mole of the dihalogenated aromatic compound.

[Formula 6]

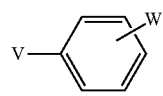
(VI)

In Formula (VI), V represents a halogen.

In the method of producing the polyphenylene sulfide block copolymer of the present invention, the polyphenylene sulfide (A) is preferably a polyphenylene sulfide produced by heating and reacting a mixture containing at least a polyphenylene sulfide, an organic polar solvent, and a sulfidizing agent in an amount of less than 2 mol % per mole of the repeating unit of the polyphenylene sulfide represented by Formula (VII) to give a reaction mixture, adding to the reaction mixture the monohalogenated compound having a reactive functional group represented by Formula (VI) in an amount of 1.0 to 10 moles per mole of the sulfidizing agent, and heating the resulting mixture.

[Formula 7]

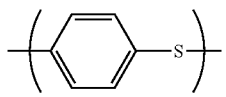

(VII)

In the method of producing the polyphenylene sulfide block copolymer of the present invention, the reactive functional group W is preferably a functional group selected from amino, carboxyl, and hydroxyl groups.

The present invention provides, according to one aspect, a polyphenylene sulfide block copolymer containing polyphenylene sulfide units with a number average molecular weight of 6,000 or more. This may overcome the disadvantages of the related art, poor heat resistance and chemical resistance.

DETAILED DESCRIPTION OF EMBODIMENTS OF THE INVENTION

The present invention will now be described in detail.
(1) Polyphenylene Sulfide Block Copolymer The polyphenylene sulfide block copolymer in an embodiment of the present invention is a block copolymer containing polyphenylene sulfide units represented by the following Formula (I) and aromatic polyester units represented by the following Formula (II).

[Formula 8]

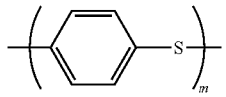

(I)

[Formula 9]

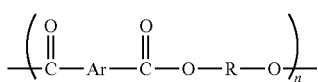

(II)

The number average molecular weight (Mn) of the polyphenylene sulfide units represented by Formula (I) is 6,000 or more, preferably 7,000 or more, more preferably 8,000 or more, and particularly preferably 10,000 or more. Its upper limit is 100,000 or less, preferably 80,000 or less, and particularly preferably 50,000 or less. In the polyphenylene sulfide block copolymer, polyphenylene sulfide units having a number average molecular weight of less than 6,000 tends to result in a polyphenylene sulfide block copolymer with poor heat resistance and chemical resistance, whereas polyphenylene sulfide units having a number average molecular weight of more than 100,000 results in an increased viscosity during melting of polyphenylene sulfide, making it difficult to give a polyphenylene sulfide block copolymer. The values of number average molecular weight are determined by gel permeation chromatography (GPC) in terms of polystyrene. The polyphenylene sulfide units in the block copolymer in the present invention can be recovered by decomposing the aromatic polyester units in the block copolymer by alkali heat treatment, for example, by heat treating the block copolymer at 50° C. using a 7N aqueous sodium hydroxide solution having a weight 100 times that of the block copolymer.

Ar in the aromatic polyester units in the polyphenylene sulfide block copolymer of the present invention represents an optionally substituted arylene group of 6 to 20 carbon atoms, and specific examples include the following structures.

[Formula 10]

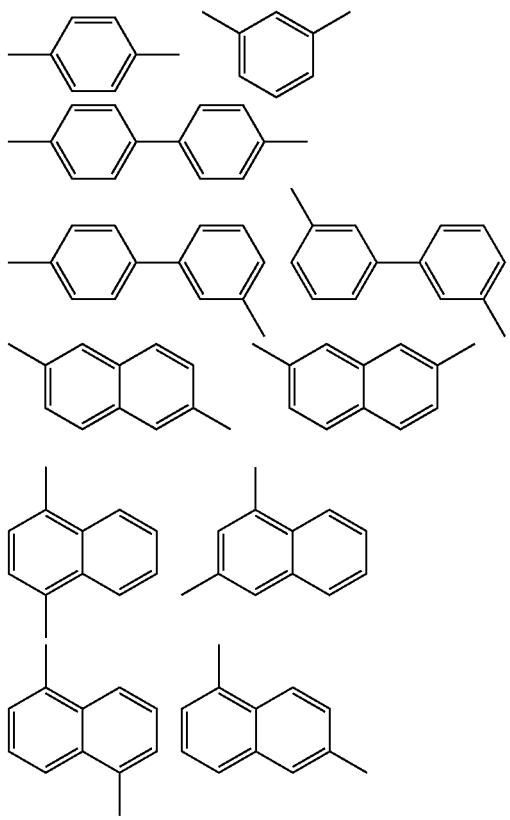

In the formulas, hydrogen on the aromatic ring may be substituted with halogen, alkyl of 1 to 3 carbon atoms, phenyl, cyano, nitro, sulfonic, metal sulfonate, alkoxy, or any other group. A particularly preferred Ar is phenylene. Furthermore, Ar in the aromatic polyester units in the polyphenylene sulfide block copolymer may be of one type or two or more types.

When the aromatic polyester units contain a m-phenylene group substituted with a metal sulfonate group as represented by the following Formula (VIII), the affinity between the polyphenylene sulfide (A) represented by Formula (I) and the aromatic polyester (B) can be increased, which advantageously facilitates block copolymerization reaction.

[Formula 11]

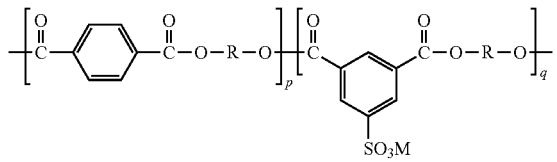

(VIII)

p and q in Formula (VIII) are different integers.

M in Formula (VIII) represents an alkali metal such as Na, Li, or K, and Na is particularly preferred. The content of the m-phenylene group substituted with a metal sulfonate group in Formula (VIII), i.e., p and q preferably, but not necessarily, satisfy the following Relation (1) because the polyphenylene sulfide (A) and the aromatic polyester (B) tends to have a high affinity, which facilitates block copolymerization reaction.

$$0.1 \leq (q/(p+q)) \times 100 \leq 20 \quad (1)$$

The content of the m-phenylene group substituted with a metal sulfonate group represented by Formula (VIII) in the aromatic polyester (B) represented by (II) can be determined, for example, by a method in which the aromatic polyester units in the block copolymer are decomposed by alkali heat treatment, for example, by heat treating the block copolymer at 50° C. using a 7N aqueous sodium hydroxide solution having a weight 100 times that of the block copolymer, components eluted into the alkaline solution are recovered, and the recovered components are analyzed by nuclear magnetic resonance (NMR) spectroscopy.

Furthermore, R in Formula (II) or (VIII) is a divalent aliphatic hydrocarbon group of 1 to 10 carbon atoms, preferably a linear, branched, or cyclic divalent aliphatic hydrocarbon group, more preferably a linear or branched alkylene group of 2 to 8 carbon atoms, a cycloalkylene group of 4 to 10 carbon atoms, or a cycloalkylenedialkylene group of 6 to 10 carbon atoms, still more preferably an ethylene group, a butylene group, or a hexylene group, and particularly preferably an ethylene group.

The polyphenylene sulfide block copolymer of an embodiment of the present invention is a block copolymer composed of polyphenylene sulfide units and aromatic polyester units, and the amount of polyphenylene sulfide unit in the block copolymer is preferably 5% by weight to 95% by weight, more preferably 10% by weight to 90% by weight, based on the total amount of the block copolymer. When the amount of polyphenylene sulfide unit in the polyphenylene sulfide block copolymer is in this range, a homogeneous copolymer tends to be provided, and properties derived from polyphenylene sulfide units, such as high heat resistance and chemical resistance, tend to be exhibited.

In the polyphenylene sulfide block copolymer of the present invention, the polyphenylene sulfide units represented by Formula (I) and the aromatic polyester units represented by Formula (II) may be bonded via a structure other than the repeating units of these blocks, or alternatively, these units may be bonded directly via end structures deriving from the repeating units of these units. Furthermore, a plurality of the same units may be present in one polyphenylene sulfide block copolymer molecule.

The number average molecular weight of the polyphenylene sulfide block copolymer of the present invention varies depending on the structure of the aromatic polyester units forming the block copolymer, and it is, for example, 6,500 or more, preferably 8,000 or more, and more preferably 10,000 or more. Its upper limit is, for example, 2,000,000 or less, preferably 1,000,000 or less, and more preferably 500,000 or less. Block copolymers having a number average molecular weight in this range tend to have good physical properties. Also, the block copolymer of the present invention having a unimodal molecular weight distribution is also a preferred aspect. The values of number average molecular weight are determined by gel permeation chromatography (GPC) in terms of polystyrene.

(2) Cyclic Polyphenylene Sulfide (a)

In an embodiment of the present invention, the cyclic polyphenylene sulfide (a) used to synthesize the polyphenylene sulfide (A) is a monomer or mixture of a cyclic compound as represented by the following Formula (V) containing the repeating unit of the formula -(Ph-S)— as the main structural unit, preferably containing the repeating unit in an amount of 80 mol % or more, and the cyclic compound of Formula (V) is contained in an amount of at least 50% by weight, preferably at least 70% by weight, more preferably at least 80% by weight, and still more preferably at least 90% by weight.

[Formula 12]

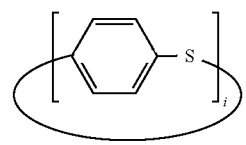

(V)

The cyclic polyphenylene sulfide (a) may contain cyclic polyphenylene sulfide in any amount, but the upper limit is preferably 98% by weight or less, more preferably 95% by weight or less. In general, as the weight fraction of cyclic polyphenylene sulfide in the cyclic polyphenylene sulfide (a) increases, the molecular weight of the polyphenylene sulfide that has been heated tends to increase. However, since the melting temperature tends to be high when the weight fraction of cyclic polyphenylene sulfide in the cyclic polyphenylene sulfide (a) is over the above upper limit, the weight fraction of cyclic polyphenylene sulfide should be preferably within the above range.

The repeat number i in Formula (V) is preferably, but not necessarily, from 4 to 50, more preferably from 4 to 25, and still more preferably from 4 to 15. As described below, conversion of cyclic polyphenylene sulfide into polyphenylene sulfide by heating is preferably carried out at or above the temperature at which cyclic polyphenylene sulfide melts, but the melting temperature of cyclic polyphenylene sulfide tends to increase as the repeat number i increases. Thus, to enable the conversion of cyclic polyphenylene sulfide into polyphenylene sulfide at lower temperatures, it is advantageous that the repeat number i should be in the above range.

Furthermore, the cyclic polyphenylene sulfide may be either a single compound having a single repeat number or a mixture of cyclic compounds having different repeat numbers. However, a mixture of cyclic compounds having different repeat numbers tends to have a lower melting temperature than a single compound having a single repeat number, and using a mixture of cyclic compounds having different repeat numbers is preferred because the temperature during the conversion into polyphenylene sulfide can be lower.

The component other than cyclic polyphenylene sulfide in the cyclic polyphenylene sulfide (V) is preferably a polyphenylene sulfide oligomer. As used herein, the polyphenylene sulfide oligomer is a linear homooligomer or cooligomer containing the repeating unit of the formula -(Ph-S)— as the main structural unit, preferably containing the repeating unit in an amount of 80 mol % or more. The molecular weight of the polyphenylene sulfide oligomer may be, for example, lower than that of polyphenylene sulfide. Specifically, a number average molecular weight of less than 5,000 is preferred.

(3) Sulfide Compound

In an embodiment of the present invention, the sulfide compound used to synthesize the polyphenylene sulfide (A) is a sulfide compound having reactive functional groups represented by the following Formula (IV).

[Formula 13]

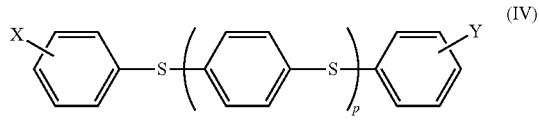

In Formula (IV), at least one of X and Y is a reactive functional group selected from amino, carboxyl, hydroxyl, acid anhydride, isocyanate, epoxy, silanol, and alkoxysilane groups, and derivatives thereof, preferably a reactive functional group selected from amino, carboxyl, and hydroxyl groups.

The repeat number p in the sulfide compound is an integer of 0 to 20, and p may be a single integer or a combination of different integers. Preferably, p is an integer of 0 to 15, more preferably 0 to 10, and a repeat number p greater than 20 is not preferred because compatibility with cyclic polyphenylene sulfide and low-viscosity properties may be adversely affected.

Specific examples of such sulfide compounds include bis(2-aminophenyl) sulfide, bis(3-aminophenyl) sulfide, bis(4-aminophenyl) sulfide, bis(2-carboxyphenyl) sulfide, bis(3-carboxyphenyl) sulfide, bis(4-carboxyphenyl) sulfide, bis(2-hydroxyphenyl) sulfide, bis(3-hydroxyphenyl) sulfide, bis(4-hydroxyphenyl) sulfide, bis(4-hydroxy-3-methylphenyl) sulfide, 5,5'-thiodisalicylic acid, 2,2',4,4'-tetrahydroxydiphenyl sulfide, and oligomers thereof. Of these, bis(4-aminophenyl) sulfide, bis(4-carboxyphenyl) sulfide, bis(4-hydroxyphenyl) sulfide, and oligomers thereof are more suitable for use in terms of reactivity and crystallinity. These sulfide compounds may be used alone, or two or more of them may be used as a mixture or in combination.

(4) Sulfidizing Agent

In the present invention, the sulfidizing agent used to synthesize the polyphenylene sulfide (A) may be any agent capable of introducing sulfide bonds into a dihalogenated aromatic compound, and examples include alkali metal sulfides, alkali metal hydrosulfides, and hydrogen sulfide.

Specific examples of alkali metal sulfides include lithium sulfide, sodium sulfide, potassium sulfide, rubidium sulfide, cesium sulfide, and mixtures of two or more thereof. Of these, lithium sulfide and/or sodium sulfide are preferred, and sodium sulfide is more preferred. Any of these alkali metal sulfides can be used as a hydrate or an aqueous mixture, or in the form of an anhydride. The aqueous mixture refers to an aqueous solution, a mixture of an aqueous solution and a solid component, or a mixture of water and a solid component. Commonly available, inexpensive alkali metal sulfides are hydrates or aqueous mixtures, and thus, alkali metal sulfides in such a form are suitable for use.

Specific examples of alkali metal hydrosulfides include lithium hydrosulfide, sodium hydrosulfide, potassium hydrosulfide, rubidium hydrosulfide, cesium hydrosulfide, and mixtures of two or more thereof. Of these, lithium hydrosulfide and/or sodium hydrosulfide are preferred, and sodium hydrosulfide is more preferred.

Alkali metal sulfides produced in the reaction system of an alkali metal hydrosulfide and an alkali metal hydroxide can also be used. In addition, alkali metal sulfides produced by contacting an alkali metal hydrosulfide with an alkali metal hydroxide in advance can also be used. Any of these alkali metal hydrosulfides and alkali metal hydroxides can be used as a hydrate or an aqueous mixture, or in the form of an anhydride, and is preferably used as a hydrate or an aqueous mixture in terms of availability and cost.

Furthermore, alkali metal sulfides produced in the reaction system of an alkali metal hydroxide, such as lithium hydroxide or sodium hydroxide, and hydrogen sulfide can also be used. In addition, alkali metal sulfides produced by contacting an alkali metal hydroxide, such as lithium hydroxide or sodium hydroxide, with hydrogen sulfide in advance can also be used. Hydrogen sulfide may be used in the gaseous state, liquid state, or aqueous solution state.

Alkali metal hydroxides and/or alkaline earth metal hydroxides can be used in combination with the sulfidizing agent. Specific examples of suitable alkali metal hydroxides include sodium hydroxide, potassium hydroxide, lithium hydroxide, rubidium hydroxide, cesium hydroxide, and mixtures of two or more thereof. Specific examples of alkaline earth metal hydroxides include calcium hydroxide, strontium hydroxide, and barium hydroxide. Of these, sodium hydroxide is suitable for use.

When an alkali metal hydrosulfide is used as the sulfidizing agent, it is particularly preferable to simultaneously use an alkali metal hydroxide, the amount of which is in the range of 0.95 mole to 1.50 moles, preferably 1.00 mole to 1.25 moles, and more preferably 1.005 moles to 1.200 moles, per mole of the alkali metal hydrosulfide. When hydrogen sulfide is used as the sulfidizing agent, it is particularly preferable to simultaneously use an alkali metal hydroxide. The amount of alkali metal hydroxide in this case is in the range of 2.0 to 3.0 moles, preferably 2.01 to 2.50 moles, and more preferably 2.04 to 2.40 moles, per mole of hydrogen sulfide.

(5) Dihalogenated Aromatic Compound

In the present invention, examples of dihalogenated aromatic compounds used to synthesize the polyphenylene sulfide (A) include dihalogenated benzenes such as p-dichlorobenzene, o-dichlorobenzene, m-dichlorobenzene, p-dibromobenzene, o-dibromobenzene, m-dibromobenzene, 1-bromo-4-chlorobenzene, and 1-bromo-3-chlorobenzene; and dihalogenated aromatic compounds containing substituents other than halogens, such as 1-methoxy-2,5-dichlorobenzene, 1-methyl-2,5-dichlorobenzene, 1,4-dimethyl-2,5-dichlorobenzene, 1,3-dimethyl-2,5-dichlorobenzene, and 3,5-dichlorobenzoic acid. In particular, halogenated aromatic compounds composed mainly of p-dihalogenated benzenes such as p-dichlorobenzene are preferred. Particularly preferred are those containing p-dichlorobenzene in an amount of 80 to 100 mol %, more preferably 90 to 100 mol %. Two or more different dihalogenated aromatic compounds may be used in combination.

(6) Organic Polar Solvent

In the present invention, examples of organic polar solvents preferably used to synthesize the polyphenylene sulfide (A) include organic amide solvents. Specific examples include aprotic organic solvents including N-alkyl pyrrolidones such as N-methyl-2-pyrrolidone, N-ethyl-2-pyrrolidone, and N-cyclohexyl-2-pyrrolidone, caprolactams such as N-methyl-ε-caprolactam, 1,3-dimethyl-2-imidazolidinone, N,N-dimethylacetamide, N,N-dimethylformamide, hexamethylphosphoric triamide, and mixtures thereof. These are suitable for use for their high reaction stabilities. Of these, N-methyl-2-pyrrolidone and 1,3-dimethyl-2-imidazolidinone are preferred, and N-methyl-2-pyrrolidone is more preferred.

(7) Monohalogenated Compound

In the present invention, the monohalogenated compound used to synthesize the polyphenylene sulfide (A) may be any monohalogenated compound having a reactive functional group W represented by the following Formula (VI). Preferred are those having as a reactive functional group W a functional group selected from amino, carboxyl, hydroxyl, acid anhydride, isocyanate, epoxy, silanol, and alkoxysilane groups, and derivatives thereof, and more preferred are those having an amino, carboxyl, or hydroxyl group as a functional group.

[Formula 14]

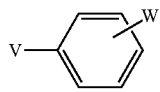

(VI)

In Formula (VI), V represents a halogen.

Specific examples of such monohalogenated compounds include monohalogenated compounds such as 2-chlorobenzoic acid, 3-chlorobenzoic acid, 4-chlorobenzoic acid, 2-amino-4-chlorobenzoic acid, 4-chloro-3-nitrobenzoic acid, 4'-chlorobenzophenone-2-carboxylic acid, 2-chloroaniline, 3-chloroaniline, 4-chloroaniline, 2-chlorophenol, 3-chlorophenol, and 4-chlorophenol. Of these, 4-chlorobenzoic acid, 4-chloroaniline, and 4-chlorophenol are more preferred in terms of reactivity in polymerization, versatility, and other properties. These monohalogenated compounds may be used alone or in a combination of two or more.

(8) Aromatic Polyester (B)

The aromatic polyester (B) used in methods of producing the polyphenylene sulfide block copolymer of the present invention may be any aromatic polyester having the following Formula (II) in the main chain.

[Formula 15]

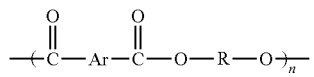

(II)

Ar in Formula (II) represents an optionally substituted arylene group of 6 to 20 carbon atoms, and specific examples include the following structures.

[Formula 16]

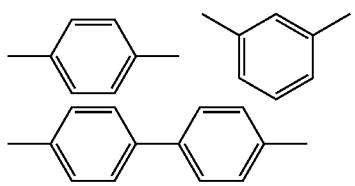

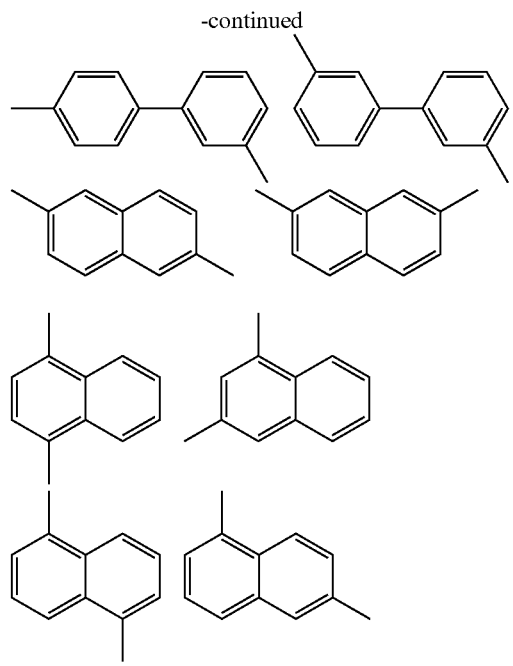

In the formulas, hydrogen on the aromatic ring may be substituted with halogen, alkyl of 1 to 3 carbon atoms, phenyl, cyano, nitro, sulfonic, metal sulfonate, alkoxy, or any other group. A particularly preferred Ar is phenylene. Furthermore, Ar in the aromatic polyester units in the polyphenylene sulfide block copolymer may be of one type or two or more types.

Furthermore, R in Formula (II) is a divalent aliphatic hydrocarbon group of 1 to 10 carbon atoms, preferably a linear, branched, or cyclic divalent aliphatic hydrocarbon group, more preferably a linear or branched alkylene group of 2 to 8 carbon atoms, a cycloalkylene group of 4 to 10 carbon atoms, or a cycloalkylenedialkylene group of 6 to 10 carbon atoms, still more preferably an ethylene group, a butylene group, or a hexylene group, and particularly preferably an ethylene group.

The aromatic polyester (B) can be produced from a dicarboxylic acid or dicarboxylic acid alkyl ester and a diol corresponding to each other. Specific examples of the dicarboxylic acid or dicarboxylic acid alkyl ester used to produce the aromatic polyester (B) include terephthalic acid, isophthalic acid, diphenyl-4,4'-dicarboxylic acid, diphenyl-4,3'-dicarboxylic acid, diphenyl-3,3'-dicarboxylic acid, 2,6-naphthalenedicarboxylic acid, 2,7-naphthalenedicarboxylic acid, 1,4-naphthalenedicarboxylic acid, 1,3-naphthalenedicarboxylic acid, 1,5-naphthalenedicarboxylic acid, 1,6-naphthalenedicarboxylic acid, 5-sodium sulfoisophthalic acid, and alkyl esters thereof. Examples of the dicarboxylic acid alkyl ester in the present invention include lower alkyl esters, acid anhydrides, and acyl chlorides of the above dicarboxylic acids, and, for example, methyl esters, ethyl esters, and hydroxyethyl esters are suitable for use. A more preferred aspect of the dicarboxylic acid or dicarboxylic acid dialkyl ester of the present invention is terephthalic acid or dimethyl ester thereof because polyester resins having high melting points and easy to process can be produced.

Examples of the diol include ethylene glycol, 1,3-propanediol, 1,4-butanediol, neopentyl glycol, 1,5-pentanediol, 1,6-hexanediol, decamethylene glycol, 2,2,4,4-tetramethyl- 1,3-cyclobutanediol, and cyclohexanedimethanol. Of these, ethylene glycol is preferred because polyester resins easy to process can be produced.

The aromatic polyester (B) may be any aromatic polyester produced using a suitable dicarboxylic acid or dicarboxylic acid alkyl ester and a suitable diol, and the dicarboxylic acid or dicarboxylic acid alkyl ester and the diol each may be used alone or in a combination of two or more. Examples of the aromatic polyester (B) include polyethylene terephthalate, polypropylene terephthalate, polybutylene terephthalate, polycyclohexanedimethylene terephthalate, polyethylene isophthalate, polypropylene isophthalate, polybutylene isophthalate, polycyclohexanedimethylene isophthalate, polyethylene naphthalate, polypropylene naphthalate, polybutylene naphthalate, polyethylene isophthalate/terephthalate, polypropylene isophthalate/terephthalate, polybutylene isophthalate/terephthalate, polyethylene terephthalate/naphthalate, polypropylene terephthalate/naphthalate, polybutylene terephthalate/naphthalate, polyethylene terephthalate/5-sodium sulfoisophthalate, polypropylene terephthalate/5-sodium sulfoisophthalate, polybutylene terephthalate/5-sodium sulfoisophthalate, polyethylene terephthalate/polyethylene glycol, polypropylene terephthalate/polyethylene glycol, polybutylene terephthalate/polyethylene glycol, polyethylene terephthalate/polytetramethylene glycol, polypropylene terephthalate/polytetramethylene glycol, polybutylene terephthalate/polytetramethylene glycol, polyethylene terephthalate/isophthalate/polytetramethylene glycol, polypropylene terephthalate/isophthalate/polytetramethylene glycol, polybutylene terephthalate/isophthalate/polytetramethylene glycol, polyethylene terephthalate/succinate, polypropylene terephthalate/succinate, polybutylene terephthalate/succinate, polyethylene terephthalate/adipate, polypropylene terephthalate/adipate, polybutylene terephthalate/adipate, polyethylene terephthalate/sebacate, polypropylene terephthalate/sebacate, and polybutylene terephthalate/sebacate. As used herein, "/" denotes a copolymer. In particular, polyethylene terephthalate, which is produced using terephthalic acid or dimethyl ester thereof and ethylene glycol as a diol component, is preferred.

The method of producing the aromatic polyester (B) includes the following two steps: a first step involving (B-1) esterification reaction or (B-2) transesterification reaction and a subsequent second step involving (B-3) polymerization reaction.

In the first step, the step of (B-1) esterification reaction is a step of esterifying a dicarboxylic acid and a diol at a given temperature until a given amount of water is distilled out to produce a low polymer. The step of (B-2) transesterification reaction is a step of transesterifying a dicarboxylic acid alkyl ester and a diol at a given temperature until a given amount of alcohol is distilled out to produce a low polymer.

The second step, (B-3) polymerization reaction, is a step of reducing the pressure in a reactor containing the low polymer produced in (B-1) esterification reaction or (B-2) transesterification reaction to initiate polymerization reaction (hereinafter referred to as "polymerization reaction initiation point") and carrying out the polymerization, while adjusting the temperature and pressure in the reactor and the stirring speed, until the time when the stirring torque reaches a predetermined value, that is, the time when the polyester has a desired viscosity (hereinafter referred to as "polymerization reaction finishing point") to produce a high-molecular-weight polyester.

In the method of producing the aromatic polyester (B) according to the present invention, catalysts that can be used in the esterification reaction are compounds such as manganese, cobalt, zinc, titanium, and calcium. Alternatively, the esterification reaction may be carried out without a catalyst. Examples of the catalyst used in the transesterification reaction include compounds such as magnesium, manganese, calcium, cobalt, zinc, lithium, and titanium. Examples of the catalyst used in the polymerization reaction include compounds such as antimony, titanium, aluminum, tin, and germanium.

Examples of antimony compounds include antimony oxides, antimony carboxylates, and antimony alkoxides. Specifically, antimony oxides include antimony trioxide and antimony pentoxide; antimony carboxylates include antimony acetate, antimony oxalate, and antimony potassium tartrate; and antimony alkoxides include antimony tri-n-butoxide and antimony triethoxide. Examples of titanium compounds include titanium complexes, titanium alkoxides such as tetra-i-propyl titanate, tetra-n-butyl titanate, and tetra-n-butyl titanate tetramers, titanium oxides produced by hydrolysis of titanium alkoxides, and titanium acetylacetonate. In particular, titanium complexes containing polycarboxylic acids and/or hydroxycarboxylic acids and/or polyhydric alcohols as chelating agents are preferred in terms of thermal stability and color of polymers and reduction in deposition on spinnerets. Examples of chelating agents in titanium compounds include lactic acid, citric acid, mannitol, and tripentaerythritol. In particular, the titanium mannitol chelate complex produced by the method described in JP 2010-100806 A can advantageously reduce the generation of foreign particles in polymers. Examples of aluminum compounds include aluminum carboxylates, aluminum alkoxides, aluminum chelate compounds, and basic aluminum compound, and specific examples include aluminum acetate, aluminum hydroxide, aluminum carbonate, aluminum ethoxide, aluminum isopropoxide, aluminum acetylacetonate, and basic aluminum acetate. Examples of tin compounds include monobutyltin oxide, dibutyltin oxide, methylphenyltin oxide, tetraethyltin oxide, hexaethylditin oxide, triethyltin hydroxide, monobutylhydroxytin oxide, monobutyltin trichloride, and dibutyltin sulfide. Examples of germanium compounds include germanium oxides and germanium alkoxides. Specifically, germanium oxides include germanium dioxide and germanium tetroxide, and germanium alkoxides include germanium tetraethoxide and germanium tetrabutoxide. Specific examples of magnesium compounds include magnesium oxide, magnesium hydroxide, magnesium alkoxide, magnesium acetate, and magnesium carbonate. Specific examples of manganese compounds include manganese chloride, manganese bromide, manganese nitrate, manganese carbonate, manganese acetylacetonate, and manganese acetate. Specific examples of calcium compounds include calcium oxide, calcium hydroxide, calcium alkoxide, calcium acetate, and calcium carbonate. Specific examples of cobalt compounds include cobalt chloride, cobalt nitrate, cobalt carbonate, cobalt acetylacetonate, cobalt naphthenate, and cobalt acetate tetrahydrate. Specific examples of zinc compounds include zinc oxide, zinc alkoxide, and zinc acetate. These metal compounds may be hydrates.

Furthermore, high-molecular-weight polyesters can also be used as the aromatic polyester (B), and solid phase polymerization may further be performed to produce the aromatic polyester (B) with a high molecular weight. The solid phase polymerization is performed by heating in an inert gas atmosphere or under reduced pressure using any apparatus and method. The inert gas may be any gas inert to polyesters. Examples include nitrogen, helium, and carbonic acid gas, and nitrogen is suitable for use in terms of economic efficiency. For the reduced pressure conditions, the pressure is preferably as low as possible to shorten the time necessary for the solid polymerization reaction, but the pressure is preferably maintained at or above 110 Pa.

(9) Polyphenylene Sulfide (A)

The polyphenylene sulfide (A) for use in the method of producing the polyphenylene sulfide block copolymer of the present invention may be any polyphenylene sulfide that provides a polyphenylene sulfide block copolymer upon being heated with the aromatic polyester (B). Particularly preferred is a linear homopolymer containing the repeating unit of the formula -(Ph-S)— as the main structural unit.

The number average molecular weight (Mn) of the polyphenylene sulfide (A) is preferably 6,000 or more, more preferably 7,000 or more, still more preferably 8,000 or more, and particularly preferably 10,000 or more. Its upper limit is preferably 100,000 or less, more preferably 80,000 or less, and still more preferably 50,000 or less. The polyphenylene sulfide (A) having a number average molecular weight in this range provides excellent properties such as mechanical strength and chemical resistance. The values of number average molecular weight are determined by gel permeation chromatography (GPC) in terms of polystyrene.

Furthermore, the polyphenylene sulfide (A) preferably has an end structure that is a reactive functional group end structure selected from amino, carboxyl, hydroxyl, acid anhydride, isocyanate, epoxy, silanol, and alkoxysilane groups, and derivatives thereof. Of these, the end structure of the polyphenylene sulfide (A) is particularly preferably a reactive end structure selected from amino, carboxyl, and hydroxyl groups. The polyphenylene sulfide (A) having such a reactive end structure, as a result of reaction with the aromatic polyester (B), tends to easily form blocks with high efficiency.

To produce such a preferred polyphenylene sulfide (A), it is highly desirable to use any of the following methods: (A1) a method of producing the polyphenylene sulfide (A) in which the cyclic polyphenylene sulfide (a) is heated in the presence of a sulfide compound having reactive functional groups; (A2) a method of producing the polyphenylene sulfide (A) in which a mixture containing at least a sulfidizing agent, a dihalogenated aromatic compound, an organic polar solvent, and a monohalogenated compound having a reactive functional group is heated; and (A3) a method of producing the polyphenylene sulfide (A) in which a mixture containing at least a polyphenylene sulfide, an organic polar solvent, and a sulfidizing agent is heated and reacted to give a reaction mixture, a monohalogenated compound having a reactive functional group is added to the reaction mixture, and the resulting mixture is heated. These preferred methods of producing the polyphenylene sulfide (A) will be described below in detail.

(9-1) Method (A1) of Producing Polyphenylene Sulfide (A)

One preferred method of producing the polyphenylene sulfide (A) is heating the cyclic polyphenylene sulfide (a) in the presence of the sulfide compound (IV) having reactive functional groups. This method readily provides the polyphenylene sulfide (A) having the properties described above.

The amount of the sulfide compound (IV) in the method (A1) of producing the polyphenylene sulfide (A) is in the range of 0.01 to 25 mol %, preferably 0.01 to 15 mol %, more preferably 0.01 to 10 mol %, and particularly preferably 0.01 to 5 mol %, per mole of phenylene sulfide structural units of the cyclic polyphenylene sulfide (a). A sulfide compound in an amount in this preferred range results in a polyphenylene sulfide with reactive functional groups sufficiently introduced and having a sufficiently high molecular weight.

The heating temperature in producing the polyphenylene sulfide (A) by the production method (A1) is preferably a temperature at which a reaction mixture of the cyclic polyphenylene sulfide (a) and the sulfide compound (IV) having reactive functional groups melts, and there are no particular limitations as long as such temperature conditions are satisfied. A heating temperature in this preferred range gives the polyphenylene sulfide (A) in a short time. Although the temperature at which the cyclic polyphenylene sulfide (a) melts varies depending on the composition and molecular weight of the cyclic polyphenylene sulfide (a) and the environment during heating, the melting temperature can be estimated, for example, by analyzing the cyclic polyphenylene sulfide (a) using a differential scanning calorimeter. The lower limit of the heating temperature is, for example, 180° C. or higher, preferably 200° C. or higher, more preferably 220° C. or higher, and still more preferably 240° C. or higher. In this temperature range, the cyclic polyphenylene sulfide (a) melts, and the polyphenylene sulfide (A) can be produced in a short time. In addition, undesirable side reactions are unlikely to occur, such as cross-linking reactions and degradation reactions, for example, between polyphenylene sulfides produced by heating and between polyphenylene sulfide and cyclic polyphenylene sulfide, and the properties of the resulting polyphenylene sulfide (A) will never be reduced. The upper limit of the heating temperature is, for example, 400° C. or lower, preferably 360° C. or lower, and more preferably 340° C. or lower. At or below these temperatures, adverse effects of the undesirable side reactions on the properties of the resulting polyphenylene sulfide (A) tend to be reduced, and the polyphenylene sulfide (A) having the properties described above can be produced.

The reaction time varies depending on the various properties, such as the content, repeat number (i), and molecular weight of cyclic compounds in the cyclic polyphenylene sulfide (a) used, the type of sulfide compound used, and the conditions such as heating temperature. The reaction time is preferably set so as to prevent the above undesirable side reactions. The heating time is, for example, 0.01 to 100 hours, preferably 0.05 to 20 hours, and more preferably 0.05 to 10 hours.

The cyclic polyphenylene sulfide (a) can also be heated under substantially solvent-free conditions. Under such conditions, the temperature can be raised in a short time, and the reaction proceeds fast, as a result of which the polyphenylene sulfide (A) tends to be produced in a short time. As used herein, the term "substantially solvent-free conditions" means that the amount of solvent in the cyclic polyphenylene sulfide (a) is 10% by weight or less, more preferably 3% by weight or less.

The heating may, as a matter of course, be carried out using a commonly used polymerization reactor and may further be carried out using any apparatus equipped with a heating mechanism, such as molds for producing molded articles, compounding extruders, and melt compounding machines, and known systems such as a batch method and a continuous method can be employed.

The heating of the cyclic polyphenylene sulfide (a) is preferably carried out in a non-oxidizing atmosphere, and reduced pressure conditions are also preferred. When the heating is carried out under reduced pressure conditions, it is preferable to bring the atmosphere in the reaction system once under a non-oxidizing atmosphere before establishing reduced pressure conditions. This operation tends to reduce the occurrence of undesirable side reactions such as cross-linking reactions and degradation reactions, for example, between cyclic polyphenylene sulfides, between polyphenylene sulfides produced by heating, and between polyphenylene sulfide and cyclic polyphenylene sulfide. The term "non-oxidizing atmosphere" refers to an atmosphere in which the gas phase with which cyclic polyphenylene sulfide comes into contact has an oxygen concentration of 5% by volume or less, preferably 2% by volume or less, and more preferably is substantially free of oxygen, i.e., an inert gas atmosphere such as nitrogen, helium, or argon. Of these, the nitrogen atmosphere is particularly preferred in terms of economic efficiency and ease of handling. "Under reduced pressure conditions" means that the pressure in the reaction system is lower than atmospheric pressure, and the upper limit is preferably 50 kPa or lower, more preferably 20 kPa or lower, and still more preferably 10 kPa or lower. The lower limit is, for example, 0.1 kPa or higher, more preferably 0.2 kPa or higher. Under reduced pressure conditions not lower than the preferred lower limit, low-molecular-weight cyclic compounds in the cyclic polyphenylene sulfide are unlikely to vaporize, whereas under reduced pressure conditions not higher than the preferred upper limit, undesirable side reactions such as cross-linking reactions are less likely to occur, as a result of which the polyphenylene sulfide (A) having the properties described above can be produced. The cyclic polyphenylene sulfide (a) can also be heated under pressurized conditions. When the heating is carried out under pressurized conditions, it is preferable to bring the atmosphere in the reaction system once under a non-oxidizing atmosphere before establishing pressurized pressure conditions. "Under pressurized conditions" means that the pressure in the reaction system is higher than atmospheric pressure. The upper limit is preferably, but not necessarily, not higher than 0.2 MPa in terms of ease of handling of reactors.

(9-2) Method (A2) of Producing Polyphenylene Sulfide (A)

Another preferred method of producing the polyphenylene sulfide (A) is the production method (A2) in which a mixture containing at least a sulfidizing agent, a dihalogenated aromatic compound, an organic polar solvent, and a monohalogenated compound having a reactive functional group is heated.

The amount of dihalogenated aromatic compound in the production method (A2), to reduce degradation and efficiently produce a polyphenylene sulfide with a viscosity suitable for processing, is preferably in the range of 0.8 mole to less than 1.5 moles, more preferably 0.9 mole to less than 1.1 moles, and still more preferably 0.95 mole to less than 1.05 moles, per mole of sulfidizing agent. A dihalogenated aromatic compound in an amount in this preferred range reduces degradation and prevents the decrease in molecular weight, leading to expression of sufficient mechanical properties.

In the method (A2) of producing a polyphenylene sulfide, the amount of organic polar solvent used as a polymerization solvent for polyphenylene sulfide is not limited to any particular amount, but in terms of stable reactivity and economic efficiency, it is selected from the range of 2.5 moles to less than 5.5 moles, preferably 2.5 moles to less than 5.0 moles, and still more preferably 2.5 moles to less than 4.5 moles, per mole of sulfidizing agent.

Furthermore, in the production method (A2), in which a monohalogenated compound having a reactive functional group is added in producing a polyphenylene sulfide, the amount of monohalogenated compound is preferably in the range of 0.01 to 10 mol %, more preferably in the range of 0.1 to 8 mol %, and still more preferably in the range of 1 to 5 mol %, per mole of dihalogenated aromatic compound. A monohalogenated compound in an amount in this preferred range results in a polyphenylene sulfide (A) with a reactive end sufficiently introduced and prevents the decrease in molecular weight of the polyphenylene sulfide, leading to expression of sufficient mechanical properties.

In addition, the total amount of halogenated compounds including the dihalogenated aromatic compound and the monohalogenated compound is preferably in a specific range. The total amount of halogenated compounds is preferably 0.98 mole to less than 1.10 moles, more preferably 1.00 mole to less than 1.08 moles, and still more preferably 1.03 moles to less than 1.07 moles, per mole of sulfidizing agent. Halogenated compounds in a total amount in this preferred range reduce degradation and prevent the decrease in molecular weight, leading to expression of sufficient mechanical properties.

When the polyphenylene sulfide (A) is produced by the production method (A2), the monohalogenated compound may be added at any timing, for example, during the dewatering step described below, at the start of polymerization, or during polymerization. Also, the polyphenylene sulfide (A) may be added in several times. Addition during the dewatering step requires a reflux apparatus that prevents the monohalogenated compound from vaporizing during the dewatering step. Addition during polymerization (in a pressurized state) requires an injection apparatus and starts the reaction of the monohalogenated compound from during polymerization, as a result of which the monohalogenated compound tends to be incompletely consumed and remain in the polymerization system at the end of the polymerization. Hence, the monohalogenated compound is preferably added when the conversion of the dihalogenated aromatic compound is less than 80%, more preferably less than 70%, and most preferably from the end of the dewatering step to the start of polymerization or at the start of polymerization, that is, together with the dihalogenated aromatic compound.

In the production method (A2), the sulfidizing agent can be used in the form of a hydrate or an aqueous mixture. In this case, before adding a dihalogenated aromatic compound and a monohalogenated compound, it is preferable to perform the dewatering step where the mixture of an organic polar solvent and the sulfidizing agent is heated to remove an excess amount of water from the system. The dewatering is preferably, but not necessarily, carried out in such a manner that an alkali metal hydrosulfide and an alkali metal hydroxide are added to the organic polar solvent in an inert gas atmosphere at a temperature ranging from normal temperature to 150° C., preferably from normal temperature to 100° C., and the temperature is raised under normal or reduced pressure to at least 150° C., preferably 180 to 260° C., to evaporate water. The amount of water in the system at the end of the dewatering step is preferably 0.9 to 1.1 moles per mole of the sulfidizing agent loaded. The amount of water in the system herein refers to a value calculated by subtracting the amount of water removed from the system from the amount of water loaded in the dewatering step.

In the method (A2) of producing the polyphenylene sulfide (A) in an embodiment of the present invention, the polymerization step is performed where the reaction product prepared in the dewatering step is brought into contact with a dihalogenated aromatic compound and a monohalogenated compound in an organic polar solvent and allowed to polymerize. At the start of the polymerization step, a sulfidizing agent and a polyhalogenated aromatic compound are added to the organic polar solvent desirably in an inert gas atmosphere at a temperature ranging from 100 to 220° C., preferably from 130 to 200° C. These materials may be loaded in random order or at the same time.

The polymerization reaction is performed at a temperature ranging from 200° C. to lower than 280° C., and it may be carried out by any polymerization method that produces the effects of the present invention. Examples include a method in which the temperature is raised at a constant rate, and then the reaction is continued at 245° C. to lower than 280° C. for a given time; a method in which the reaction is carried out for a given time at a constant temperature of from 200° C. to lower than 245° C., and then the reaction is continued for a given time at an increased temperature of 245° C. to lower than 280° C.; and a method in which the reaction is carried out for a given time at a constant temperature of from 200° C. to lower than 245° C., particularly, 230° C. to lower than 245° C., and then the temperature is raised to 245° C. to lower than 280° C. to complete the reaction in a short time.

The polymerization reaction is carried out desirably in a non-oxidizing atmosphere, preferably in an inert gas atmosphere such as nitrogen, helium, or argon, and particularly preferably in a nitrogen atmosphere in terms of economic efficiency and ease of handling. The reaction pressure in the polymerization reaction is not limited to any particular value because it varies depending on the type and amount of material and solvent used, the polymerization reaction temperature, and other conditions.

In an embodiment of a method of producing the block copolymer of the present invention, the polyphenylene sulfide (A) is recovered from the polymerization reaction product obtained by the above method and used for a blocking reaction. The polymerization reaction product contains a polyphenylene sulfide and an organic polar solvent and may also contain unreacted materials, water, by-product salts, and other components. From such a reaction mixture, the polyphenylene sulfide can be recovered by any method, for example, a method in which some or most of the organic polar solvent is removed as required by distillation or any other operation, and then the mixture is brought into contact, optionally under heating, with a solvent that poorly dissolves the polyphenylene sulfide component, is miscible with the organic polar solvent, and dissolves by-product salts to recover the polyphenylene sulfide (A) as a solid. Solvents having such properties typically have relatively high polarities, and the most suitable solvent cannot be determined because it varies depending on the organic polar solvent used and the type of by-product salt. Examples include water; alcohols such as methanol, ethanol, propanol, isopropanol, butanol, and hexanol; ketones acetone and methyl ethyl ketone; and acetates such as ethyl acetate and butyl acetate. In terms of availability and economic efficiency, water, methanol, and acetone are preferred, and water is particularly preferred.

Treatment with such a solvent can reduce the amount of organic polar solvent and by-product salt in the polyphenylene sulfide (A). This treatment precipitates the polyphenylene sulfide (A) as a solid, which can be recovered using known solid-liquid separation. Solid-liquid separation can be carried out, for example, by separation by filtration, centrifugation, and decantation. This series of treatments may optionally be repeated several times. The repeated treatment tends to further reduce the amount of organic polar solvent and by-product salt in the polyphenylene sulfide (A).

The treatment with a solvent can also be carried out by mixing the polymerization reaction product with a solvent, and the mixture may optionally be stirred or heated as appropriate. The treatment with a solvent is carried out preferably, but not necessarily, at 20 to 220° C., more preferably 50 to 200° C. A temperature within this range is preferred because, for example, it facilitates the removal of by-product salts and also enables treatment under relatively low pressure. When water is used as a solvent, the water is preferably distilled water or deionized water. Alternatively, aqueous solutions may optionally be used containing organic acidic compounds such as formic acid, acetic acid, propionic acid, butyric acid, chloroacetic acid, dichloroacetic acid, acrylic acid, crotonic acid, benzoic acid, salicylic acid, oxalic acid, malonic acid, succinic acid, phthalic acid, and fumaric acid, and alkali metal salts and alkaline earth metal salts thereof; inorganic acid compounds such as sulfuric acid, phosphoric acid, hydrochloric acid, carbonic acid, and silicic acid; ammonium ions; and other compounds. The polyphenylene sulfide (A) that has been treated, when containing the solvent used for the treatment, may optionally be dried to remove the solvent.

(9-3) Method (A3) of Producing Polyphenylene Sulfide (A)

Still another preferred method of producing the polyphenylene sulfide (A) is a production method including performing Reaction (A3-1) by heating a mixture containing at least a polyphenylene sulfide, an organic polar solvent, and a sulfidizing agent, and performing Reaction (A3-2) by adding a monohalogenated compound having a reactive functional group to the resulting reaction mixture. Reaction (A3-1) and Reaction (A3-2) will be described below in detail.

Reaction (A3-1)

In Reaction (A3-1), a mixture containing at least a polyphenylene sulfide, an organic polar solvent, and a sulfide compound is heated and reacted.

The amount of polyphenylene sulfide used in Reaction (A3-1) is not limited as long as the polyphenylene sulfide is contained in the reaction mixture at the start of reaction, but the amount of sulfidizing agent is preferably less than 2 mol %, more preferably less than 1 mol %, per mole of the repeating units represented by the following formula, the main structural unit of the polyphenylene sulfide.

[Formula 16]

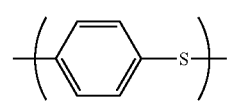

(I)

The lower limit of the amount of sulfidizing agent based on the amount of polyphenylene sulfide is preferably 0.01 mol % or more, more preferably 0.1 mol % or more. A polyphenylene sulfide and a sulfidizing agent in amounts in this preferred range provides advantages in that degradation of the physical properties of the resulting polyphenylene sulfide (A) due to having a low molecular weight tends to be reduced, and reactive functional groups are introduced into the polyphenylene sulfide (A) with high efficiency.

Although the amount of organic polar solvent for use in Reaction (A3-1) is not limited to any particularly amount, it is, for example, in the range of 2.5 moles to less than 50.0 moles, preferably 2.5 moles to less than 10.0 moles, and more preferably 2.5 moles to less than 5.5 moles, per mole of sulfur atoms in the reaction constituent in the reaction mixture, in terms of stable reactivity and economic efficiency.

In Reaction (A3-1) in which a mixture containing at least a polyphenylene sulfide, an organic polar solvent, and a sulfidizing agent is heated and reacted, although the reaction temperature varies depending on the types and amounts of polyphenylene sulfide, organic polar solvent, and sulfidizing agent used in the reaction, it is typically in the range of 120 to 280° C., preferably 150 to 270° C., and more preferably 200 to 250° C. Temperatures in this preferred range tend to result in a higher reaction rate. The reaction may be a single-step reaction at a constant temperature, a multistep reaction in which the temperature is increased stepwise, or a reaction in which the temperature is continuously changed.

Although the reaction time varies depending on the type and amount of materials used or the reaction temperature, it is preferably at least 0.1 hour, more preferably at least 0.5 hour, and still more preferably at least 1 hour. A reaction of at least this preferred time tends to sufficiently reduce unreacted components. Although the reaction may be continued for any period of time, the reaction proceeds sufficiently within 40 hours. The reaction time is preferably within 10 hours, more preferably within 6 hours.

When at least a polyphenylene sulfide and a sulfidizing agent are heated and reacted in an organic polar solvent, components that substantially do not inhibit the reaction and components that promote the reaction can also be added in addition to the essential components. The reaction is preferably, but not necessarily, carried out under stirring. Furthermore, in Reaction (A3-1), known various polymerization methods and reaction methods, such as a batch method and a continuous method, can be employed. Reaction (A3-1) is desirably carried out in a non-oxidizing atmosphere, preferably in an inert atmosphere such as nitrogen, helium, or argon, and preferably in a nitrogen atmosphere in terms of economic efficiency and ease of handling.

If large quantities of water are present in the reaction system in Reaction (A3-1), an unfavorable phenomenon such as a decrease in reaction rate tends to manifest. Thus, also in Reaction (A3-1), it is preferable to perform the dewatering step for removing an excess amount of water from the system by the same method as noted in Section (9-2).

Reaction (A3-2)

Reaction (A3-2) is carried out by adding a monohalogenated compound having a reactive functional group to the reaction mixture obtained in Reaction (A3-1).

The amount of monohalogenated compound added is preferably, but not necessarily, 1.0 to 10 moles, more preferably 2.0 to 5.0 moles, and particularly preferably 2.5 to 4.5 moles, per mole of the sulfidizing agent used in Reaction (A3-1). A monohalogenated compound added in an amount in such a preferred range is preferred because reactive functional groups are introduced with high efficiency.

Although the preferred reaction temperature in Reaction (A3-2) varies depending on the type and amount of components in the reaction mixture, the molecular weight of the polyphenylene sulfide in the reaction mixture obtained in Reaction (A3-1), and other factors, it is typically in the range of 120 to 280° C., preferably 150 to 270° C., and more preferably at 200 to 250° C. Temperatures in this preferred range tend to result in a higher reaction rate. The reaction may be a single-step reaction at a constant temperature, a multistep reaction in which the temperature is increased stepwise, or a reaction in which the temperature is continuously changed.

Although the reaction time in Reaction (A3-2) varies depending on the molecular weight of the polyphenylene sulfide in the reaction mixture obtained in Reaction (A3-1), the type and amount of other components in the reaction mixture, and the reaction temperature, it is, for example, at least 0.05 hour, preferably at least 0.1 hour, more preferably at least 0.5 hour, and still more preferably at least 1 hour. Although the reaction may be continued for any period of time, the reaction proceeds sufficiently within 10 hours. The reaction time is preferably within 6 hours, more preferably within 3 hours.

In an embodiment of the method of producing the block copolymer of the present invention, the polyphenylene sulfide (A) is recovered from the reaction mixture thus obtained and used for blocking reaction, and the polyphenylene sulfide (A) can be recovered by the same method as noted in Section (9-2).

(10) Method of Producing Polyphenylene Sulfide Block Copolymer

The polyphenylene sulfide block copolymer of the present invention may be produced by any method that can produce a polyphenylene sulfide block copolymer having the characteristics described in Section (1). One particularly preferred method is to use a production method including heating and reacting the polyphenylene sulfide (A) containing the polyphenylene sulfide represented by Formula (I) as a repeating structure and the aromatic polyester (B) containing the polyester represented by Formula (II) as a repeating structure.

[Formula 17]

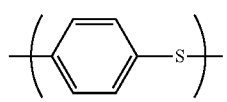
(I)

[Formula 18]

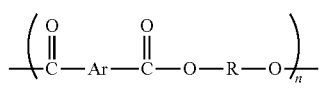
(II)

The method of producing the polyphenylene sulfide block copolymer of an embodiment of the present invention is characterized by heating and reacting a mixture containing at least the polyphenylene sulfide (A) and the aromatic polyester (B). Although the mixing ratio of the polyphenylene sulfide (A) to the aromatic polyester (B) varies depending on the molecular weight of the polyphenylene sulfide (A) used, the type and molecular weight of the aromatic polyester (B), the reaction conditions, and other factors, the amount of polyphenylene sulfide (A) is preferably in the range of 5% by weight to 95% by weight, more preferably in the range of 10% by weight to 90% by weight, based on the total weight of the polyphenylene sulfide (A) and the aromatic polyester (B). The polyphenylene sulfide (A) and the aromatic polyester (B) at a mixing ratio in such a preferred range provides advantages in that the resulting polyphenylene sulfide block copolymer tends to be a homogeneous copolymer, and in addition, properties derived from polyphenylene sulfide units, such as high heat resistance and chemical resistance, tend to be exhibited.

In producing a polyphenylene sulfide block copolymer by heating at least the polyphenylene sulfide (A) and the aromatic polyester (B), the reaction can be carried out in the absence or presence of a catalyst. In the reaction, any catalyst can be used that accelerates the reaction between the polyphenylene sulfide (A) and the aromatic polyester (B), and preferred are catalysts used to produce an aromatic polyester. Specific examples include compounds such as manganese, cobalt, zinc, titanium, and calcium, which are used as a catalyst in esterification reaction; compounds such as magnesium, manganese, calcium, cobalt, zinc, lithium, and titanium, which are used in transesterification reaction; and compounds such as antimony, titanium, aluminum, tin, and germanium, which are used in polymerization reaction, as listed in Section (8). Carrying out the reaction between the polyphenylene sulfide (A) and the aromatic polyester (B) in the presence of such a preferred catalyst provides an advantage in that a blocking reaction tends to proceed with higher efficiency.

Although the temperature at which the mixture containing at least the polyphenylene sulfide (A) and the aromatic polyester (B) is heated and reacted varies depending on the molecular weight of the polyphenylene sulfide (A), the type and molecular weight of the aromatic polyester (B), and other factors, it is preferably higher than or equal to a temperature at which the polyphenylene sulfide (A) and the aromatic polyester (B) melt, specifically, preferably 280° C. or higher, more preferably 285° C. or higher, and still more preferably 290° C. or higher. The upper limit of the reaction temperature is, for example, 400° C. or lower, preferably 380° C. or lower, and more preferably 350° C. or lower. Reaction temperatures in such a preferred range provide an advantage in that the reaction proceeds without thermal decomposition of the polyphenylene sulfide (A) and the aromatic polyester (B). The reaction may be a single-step reaction at a constant temperature, a multistep reaction in which the temperature is increased stepwise, or a reaction in which the temperature is continuously changed. The temperature at which the polyphenylene sulfide (A) and the aromatic polyester (B) melt can be determined by observing the endothermic peak temperatures of the polyphenylene sulfide (A) and the aromatic polyester (B) using a differential scanning calorimeter (DSC).

Although the reaction time between the polyphenylene sulfide (A) and the aromatic polyester (B) varies depending on the conditions such as structures and molecular weights of the polyphenylene sulfide (A) and the aromatic polyester used in the reaction and reaction temperature, it is, for example, at least 0.05 hour, preferably at least 0.1 hour, and more preferably at least 0.5 hour. Although the reaction may be continued for any period of time, the reaction proceeds sufficiently within 10 hours. The reaction time is preferably within 8 hours, more preferably within 6 hours. For the polymerization atmosphere in the method of producing the polyphenylene sulfide block copolymer of the present invention, reaction conditions generally employed in producing an aromatic polyester can be appropriately employed, for example, a reaction in an inert atmosphere such as nitrogen, helium, or argon, or a reaction under reduced pressure.

From the polyphenylene sulfide block copolymer of the present invention, the aromatic polyester (B) can be removed to produce a polyphenylene sulfide porous media.

The polyphenylene sulfide porous media may be produced by any method that can chemically decompose and remove the aromatic polyester (B) from the polyphenylene sulfide block copolymer of the present invention, and any method can be used, such as hydrolysis, thermal decomposition, or oxidative decomposition. Of these, removal by hydrolysis is suitable for use.

Removal by hydrolysis is preferably a removal by hydrolysis using an acidic aqueous solution or an alkaline aqueous solution because swelling of a matrix component due to solvent can be prevented, and the aromatic polyester (B) is hydrolyzed with high efficiency, leading to a short removal time.

The alkaline aqueous solution may be of any type. It is preferable to use a hydroxide of an alkali metal or a hydroxide of an alkaline earth metal, and in terms of the balance among cost, availability, and hydrolysis rate, it is preferable to use sodium hydroxide or potassium hydroxide.

The concentration of the alkaline aqueous solution is preferably as high as possible because the time required for decomposition and removal can be shortened, but an excessively high concentration results in an aqueous solution with a high viscosity that leads to reduced efficiency in decomposition and removal. Thus, the concentration of the aqueous solution is preferably in the range of 0.10 to 10 M.

To increase the hydrolysis rate of the aromatic polyester component (B), the temperature of the alkaline aqueous solution is preferably 60 to 120° C. To improve the removal efficiency, treatment under pressure and stirring the aqueous solution are also preferred.

After the aromatic polyester component (B) has been removed, it is preferable to remove the remaining treating liquid with an appropriate solvent. When an aqueous acid or alkaline solution is used for the treatment, for example, the solution, after the treatment, is preferably washed away with ion-exchanged water and then dried.

Through the treatment as described above, the aromatic polyester component (B) in the block copolymer is decomposed and removed to form pores, whereby a polyphenylene sulfide porous media can be produced.

EXAMPLES

The present invention will now be described in detail with reference to examples, but these examples are intended to be illustrative and not restrictive. Measurement of Molecular Weight. For the molecular weight of a polyphenylene sulfide, a cyclic polyphenylene sulfide, and a block copolymer, the number average molecular weight (Mn) and the weight average molecular weight (Mw) in terms of polystyrene were calculated by gel permeation chromatography (GPC), a type of size exclusion chromatography (SEC). The measurement conditions of GPC are given below.

Apparatus: SSC-7100 available from Senshu Scientific Co., Ltd.
Column: GPC 3506 available from Senshu Scientific Co., Ltd.
Eluent: 1-chloronaphthalene
Detector: differential refractive index detector
Column temperature: 210° C.
Pre-thermostatic bath temperature: 250° C.
Pump thermostatic bath temperature: 50° C.
Detector temperature: 210° C.
Flow rate: 10 mL/min
Sample injection volume: 300 μL (a slurry of about 0.2% by weight)

Measurement of Conversion The conversion of cyclic polyphenylene sulfide into polyphenylene sulfide was calculated by the process described below using high-performance liquid chromatography (HPLC).

About 10 mg of a product resulting from the heating of a cyclic polyphenylene sulfide was dissolved in about 5 g of 1-chloronaphthalene at 250° C. The resulting mixture was cooled to room temperature to form a precipitate. Using a membrane filter with a pore size of 0.45 μm, 1-chloronaphthalene-insoluble matter was filtered off to give 1-chloronaphthalene-soluble matter. The soluble matter obtained was subjected to HPLC measurement to quantitatively determine the amount of unreacted cyclic polyphenylene sulfide and calculate the conversion of cyclic polyphenylene sulfide into polyphenylene sulfide. The measurement conditions of HPLC are given below.

Apparatus: LC-10Avp series available from SHIMADZU CORPORATION

Column: Mightysil RP-18 GP150-4.6 (5 μm)

Detector: photodiode array detector (UV=270 nm)

Analysis of Amino Group Content Amino groups introduced into a polyphenylene sulfide were analyzed in such a manner that, for example, a molten film of the polyphenylene sulfide was produced, and using an FT-IR (an IR-810 infrared spectrophotometer available from JASCO Corporation), absorptions at or near 3,380 and 3,470 cm$^{-1}$ attributed to amino groups were compared with an absorption at 1,900 cm$^{-1}$ attributed to benzene rings (the internal standard), whereby the amount of amino group introduction was assessed relatively.

In the measurement using a molten film, a pressed film was produced as described below.

A Kapton film is placed on an aluminum sheet.

The surface of the Kapton film is cleaned with acetone, and a sample is placed thereon.

Another Kapton film is stacked, and another aluminum sheet is stacked thereon.

The stack is placed in a press mold heated to 340° C.

After retention for one minute, a pressure of 250 kgf is applied.

After retention for three minutes, the sample is taken out together with the Kapton films optionally with the aluminum sheets and immersed in water for quenching.

Analysis of Carboxyl Group Content

Carboxyl groups introduced into a polyphenylene sulfide were analyzed in such a manner that, for example, a molten film of the polyphenylene sulfide was produced, and using an FT-IR (an IR-810 infrared spectrophotometer available from JASCO Corporation), an absorption at or near 1,730 cm$^{-1}$ attributed to carboxyl groups was compared with an absorption at 1,900 cm$^{-1}$ attributed to benzene rings (the internal standard), whereby the amount of carboxyl group introduction was assessed relatively.

Analysis of Hydroxyl Group Content

Hydroxyl groups introduced into a polyphenylene sulfide were analyzed in such a manner that, for example, a molten film of the polyphenylene sulfide was produced, and using an FT-IR (an IR-810 infrared spectrophotometer available from JASCO Corporation), absorptions observed at or near 3,400 to 3,600 cm$^{-1}$ attributed to hydroxyl groups were compared with an absorption at 1,900 cm$^{-1}$ attributed to benzene rings (the internal standard), whereby the amount of hydroxyl group introduction was assessed relatively.

Quantitative Determination of Terminal Functional Group

The amount of terminal functional group introduced into a polyphenylene sulfide was quantitatively determined in such a manner that, for example, a cyclic polyphenylene sulfide and a sulfide compound having reactive functional groups were mixed to produce a molten film, and using an FT-IR (an IR-810 infrared spectrophotometer available from JASCO Corporation), the amount of terminal functional group introduction was quantitatively determined by comparing with the amount of functional group in the polyphenylene sulfide after introduction. Intrinsic Viscosity of Aromatic Polyester ([η], expressed in dL/g)

A 7% solution was prepared using o-chlorophenol (OCP) as a solvent, and the intrinsic viscosity was measured at 25° C.

Reference Example 1 (Preparation of Cyclic Polyphenylene Sulfide)

Into a stainless-steel autoclave equipped with an agitator, 14.03 g (0.120 mol) of a 48% by weight aqueous solution of sodium hydrosulfide, 12.50 g (0.144 mol) of a 48% by weight aqueous solution prepared using 96% sodium hydroxide, 615.0 g (6.20 mol) of N-methyl-2-pyrrolidone (NMP), and 18.08 g (0.123 mol) of p-dichlorobenzene (p-DCB) were loaded. The reaction vessel was thoroughly purged with nitrogen and then sealed under nitrogen gas.

While stirring at 400 rpm, the temperature was raised from room temperature to 200° C. over about 1 hour. At this point, the pressure (the gauge pressure) in the reaction vessel was 0.35 MPa. The temperature was then raised from 200° C. to 270° C. over about 30 minutes. The pressure (the gauge pressure) in the reaction vessel at this point was 1.05 MPa. After the vessel was maintained at 270° C. for 1 hour, the vessel was rapidly cooled to near room temperature, and then the contents were recovered.

The contents obtained were analyzed by gas chromatography and high-performance liquid chromatography to show that the consumption of the p-DCB monomer was 93%, and the production of cyclic polyphenylene sulfide was 18.5% assuming that all the sulfur components in the reaction mixture would convert into cyclic polyphenylene sulfide.

The contents obtained in an amount of 500 g were diluted with about 1,500 g of ion-exchanged water and then filtered through a glass filter with an average mesh opening of 10 to 16 μm. The residue on the filter was dispersed in about 300 g of ion-exchanged water, stirred at 70° C. for 30 minutes, and again filtered in the same manner as above. This operation was repeated three times to yield a white solid. The solid was dried overnight under vacuum at 80° C. to yield a dry solid.

The solid obtained was placed in an extraction thimble and subjected to Soxhlet extraction for about 5 hours using chloroform as a solvent to separate low-molecular-weight components in the solid.

After the extraction operation, the solid components remained in the extraction thimble was dried overnight under vacuum at 70° C. to yield about 6.98 g of an off-white solid. The solid was analyzed, and the absorption spectrum obtained by infrared spectroscopy indicated that the solid was a compound having a phenylene sulfide structure with a weight average molecular weight of 6,300.

From the extract obtained by the extraction operation using chloroform, the solvent was removed, and then about 5 g of chloroform was added to prepare a slurry. The slurry was added dropwise with stirring to about 300 g of methanol. The resulting precipitate was recovered by filtration and vacuum dried at 70° C. for 5 hours to yield 1.19 g of a white solid. This white powder was confirmed by the absorption spectrum obtained by infrared spectroscopy to be a compound composed of phenylene sulfide units. Furthermore, components separated by high-performance liquid chromatography were analyzed using an M-1200H mass spectrum analyzer (M-1200H available from Hitachi, Ltd.) and further MALDI-TOF-MS. The molecular weight information obtained showed that the white powder was a cyclic polyphenylene sulfide mixture composed mainly of p-phenylene sulfide units, containing a cyclic compound of 4 to 13 repeating units in an amount of about 98% by weight, and suitable for use in the production of the polyphenylene sulfide (A) in the present invention. The GPC measurement showed that the cyclic polyphenylene sulfide mixture was completely soluble in 1-chloronaphthalene at room temperature and had a weight average molecular weight of 900.

Reference Example 2 (Method of Producing Polyphenylene Sulfide (A) (Amino Group/A-1))

A powder mixture of 20 g of a cyclic polyphenylene sulfide mixture obtained by the method described in Reference Example 1 and 0.20 g (0.5 mol %), per mole of polyphenylene sulfide unit, of bis(4-aminophenyl) sulfide was placed in a glass ampule, and the ampule was purged with nitrogen. The ampule was placed in an electric furnace conditioned at 340° C. and heated for 60 minutes, after which the ampule was taken out and cooled to room temperature to yield a black solid. The product was completely soluble in 1-chloronaphthalene at 250° C. The HPLC measurement showed that the conversion of cyclic polyphenylene sulfide into polyphenylene sulfide was 96.5%.

In the GPC measurement, a peak attributed to the cyclic polyphenylene sulfide and a peak of the polyphenylene sulfide produced were observed, from which the polyphenylene sulfide obtained was found to have a weight average molecular weight of 49,000, a number average molecular weight of 24,000, and a polydispersity of 2.05. The amino group content per mole of polyphenylene sulfide structural unit was 0.15 mol %.

Reference Example 3 (Method of Producing Polyphenylene Sulfide (A) (Amino Group/A-1))

Reference Example 2 was repeated except that the reaction was carried out at 320° C. for 120 minutes using 2.0 mol % of bis(4-aminophenyl) sulfide to yield a black solid. The product was completely soluble in 1-chloronaphthalene at 250° C. The HPLC measurement showed that the conversion of cyclic polyphenylene sulfide into polyphenylene sulfide was 97.0%.

In the GPC measurement, a peak attributed to the cyclic polyphenylene sulfide and a peak of the polyphenylene sulfide produced were observed, from which the polyphenylene sulfide obtained was found to have a weight average molecular weight of 26,000, a number average molecular weight of 16,000, and a polydispersity of 1.62. The amino group content per mole of polyphenylene sulfide structural unit was 0.6 mol %.

Reference Example 4 (Method of Producing Polyphenylene Sulfide (A) (Hydroxyl Group/A-1))

Reference Example 2 was repeated except using 0.5 mol % of bis(4-hydroxyphenyl) sulfide to yield a black solid. The product was completely soluble in 1-chloronaphthalene at 250° C. The HPLC measurement showed that the conversion of cyclic polyphenylene sulfide into polyphenylene sulfide was 91.0%.

In the GPC measurement, a peak attributed to the cyclic polyphenylene sulfide and a peak of the polyphenylene sulfide produced were observed, from which the polyphenylene sulfide obtained was found to have a weight average molecular weight of 41,000, a number average molecular weight of 20,000, and a polydispersity of 2.08. The hydroxyl group content per mole of polyphenylene sulfide structural unit was 0.15 mol %.

Reference Example 5 (Method of Producing Polyphenylene Sulfide (A) (Carboxyl Group/A-1))

Reference Example 2 was repeated except that the reaction was carried out for 120 minutes using 0.5 mol % of bis(4-carboxyphenyl) sulfide to yield a black solid. The product was completely soluble in 1-chloronaphthalene at 250° C. The HPLC measurement showed that the conversion of cyclic polyphenylene sulfide into polyphenylene sulfide was 96.2%.

In the GPC measurement, a peak attributed to the cyclic polyphenylene sulfide and a peak of the polyphenylene sulfide produced were observed, from which the polyphenylene sulfide obtained was found to have a weight average molecular weight of 35,000, a number average molecular weight of 17,000, and a polydispersity of 2.06. The carboxyl group content per mole of polyphenylene sulfide structural unit was 0.37 mol %.

Reference Example 6 (Method of Producing Polyphenylene Sulfide (A) (Carboxyl Group/A-2))

Into a 70-liter autoclave equipped with an agitator and a bottom stop valve, 8.27 kg (70.0 mol) of 47.5% sodium hydrosulfide, 3.03 kg (72.69 mol) of 96% sodium hydroxide, 11.45 kg (115.50 mol) of N-methyl-2-pyrrolidone (NMP), and 5.50 kg of ion-exchanged water were loaded. At normal pressure under nitrogen, the mixture was gradually heated to 225° C. over about 3 hours. When 9.82 kg of water and 0.28 kg of NMP were distilled out, the heating was stopped and cooling was started. At this point, the amount of residual water in the system, inclusive of the water consumed in the hydrolysis of NMP, was 1.01 moles per mole of the alkali metal hydrosulfide loaded. The amount of stripped hydrogen sulfide was 1.4 moles, and thus, the amount of sulfidizing agent in the system after the process was 68.6 moles.

Thereafter, the mixture was cooled to 200° C., and 10.08 kg (68.60 mol) of p-dichlorobenzene (p-DCB), 0.213 kg (1.36 mol) of 4-chlorobenzoic acid, and 9.37 kg (94.50 mol) of NMP were added thereto. The reaction vessel was then sealed under nitrogen gas, and the mixture was heated to 250° C. at a rate of 0.6° C./min with stirring at 240 rpm and allowed to react at 250° C. for 180 minutes.

Immediately after completion of the reaction, the bottom stop valve of the autoclave was opened to flush the contents into an apparatus equipped with an agitator. The contents were dried in the apparatus equipped with an agitator at 230° C. for 1.5 hours until 95% or more of the NMP used in polymerization was volatilized away, and a solid containing PPS and salts was recovered.

The solid recovered and 74 liters of ion-exchanged water were placed in an autoclave equipped with an agitator, washed at 75° C. for 15 minutes, and then filtered through a filter to give a cake. The cake obtained was washed with ion-exchanged water at 75° C. for 15 minutes and filtered. This operation was repeated three times, and then the cake, 74 liters of ion-exchanged water, and 0.4 kg of acetic acid were placed in the autoclave equipped with an agitator. The autoclave was purged with nitrogen and then heated to 195° C. Thereafter, the autoclave was cooled, and the contents were taken out. The contents were filtered through a filter to give a cake. The cake obtained was dried under a stream of nitrogen at 120° C. to yield a dry PPS.

The GPC measurement showed that the polyphenylene sulfide obtained had a weight average molecular weight of 17,000, a number average molecular weight of 6,500, and a polydispersity of 2.62. The carboxyl group content per mole of polyphenylene sulfide structural unit was 1.01 mol %.

Reference Example 7 (Method of Producing General-Purpose Polyphenylene Sulfide)

Into a 70-liter autoclave equipped with an agitator and a bottom stop valve, 8.27 kg (70.00 mol) of 47.5% sodium hydrosulfide, 2.94 kg (70.63 mol) of 96% sodium hydroxide, 11.45 kg (115.50 mol) of N-methyl-2-pyrrolidone (NMP), 1.89 kg (23.1 mol) of sodium acetate, and 5.50 kg of ion-exchanged water were loaded. At normal pressure under nitrogen, the mixture was gradually heated to 245° C. over about 3 hours. When 9.77 kg of water and 0.28 kg of NMP were distilled out, the heating was stopped and cooling was started. At this point, the amount of residual water in the system, inclusive of the water consumed in the hydrolysis of NMP, was 1.01 moles per mole of the alkali metal hydrosulfide loaded. The amount of stripped hydrogen sulfide was 1.4 moles, and thus, the amount of sulfidizing agent in the system after the process was 68.6 moles.

Thereafter, the mixture was cooled to 200° C., and 10.44 kg (71.00 mol) of p-dichlorobenzene (p-DCB) and 9.37 kg (94.50 mol) of NMP were added thereto. The reaction vessel was then sealed under nitrogen gas, and the mixture was heated from 200° C. to 270° C. at a rate of 0.6° C./min with stirring at 240 rpm and allowed to react at 270° C. for 140 minutes. Thereafter, 2.40 kg (133 mol) of water was injected while cooling from 270° C. to 250° C. over 15 minutes. Thereafter, the mixture was gradually cooled from 250° C. to 220° C. over 75 minutes and then rapidly to near room temperature, and the contents were taken out.

The contents were diluted with about 35 liters of NMP into a slurry. The slurry was stirred at 85° C. for 30 minutes and then filtered through an 80-mesh wire net (opening size: 0.175 mm) to yield a solid. The solid obtained was washed with about 35 liters of NMP and filtered in the same manner. The solid obtained was diluted with 70 liters of ion-exchanged water, stirred at 70° C. for 30 minutes, and then filtered through an 80-mesh wire net to yield a solid. This operation was repeated three times. The solid obtained and 32 g of acetic acid were diluted with 70 liters of ion-exchanged water, stirred at 70° C. for 30 minutes, and then filtered through an 80-mesh wire net. Furthermore, the solid obtained was diluted with 70 liters of ion-exchanged water, stirred at 70° C. for 30 minutes, and then filtered through an 80-mesh wire net to yield a solid. The solid thus obtained was dried under a stream of nitrogen at 120° C. to yield a dry PPS.

The GPC measurement showed that the polyphenylene sulfide obtained had a weight average molecular weight of 48,000, a number average molecular weight of 15,000, and a polydispersity of 3.20.

Reference Example 8 (Method of Producing Polyphenylene Sulfide (A) (A-3/Carboxyl Group))

Into a stainless-steel autoclave equipped with an agitator, 21.60 g (0.20 mol) of a polyphenylene sulfide produced by the method described in Reference Example 7, 0.23 g (0.002 mol) of a 48% by weight aqueous solution of sodium hydrosulfide, 0.17 g (0.002 mol) of a 48% by weight aqueous solution prepared using 96% sodium hydroxide, and 513.4 g (5.12 mol) of N-methyl-2-pyrrolidone (NMP) were loaded. The reaction vessel was thoroughly purged with nitrogen and then sealed under nitrogen gas.

While being stirred at 400 rpm, the mixture was heated from room temperature to 200° C. over about 1 hour and from 200° C. to 250° C. over about 30 minutes, and maintained at 250° C. for 30 minutes to thereby cause a reaction. Thereafter, the mixture was cooled to 200° C., and 1.88 g (0.012 mol) of p-chlorobenzoic acid and 51.4 g (0.52 mol) of NMP were added thereto. The reaction vessel was then sealed under nitrogen gas, and the mixture was heated from 200° C. to 250° C. at a rate of 0.6° C./min with stirring at 240 rpm and allowed to react at 250° C. for 120 minutes. Thereafter, the mixture was rapidly cooled to near room temperature, and then the contents were recovered.

The contents obtained in an amount of 500 g were diluted with about 1,500 g of ion-exchanged water and then filtered through a glass filter with an average mesh opening of 10 to 16 μm. The residue on the filter was dispersed in about 1 kg of ion-exchanged water, stirred at 70° C. for 30 minutes, and filtered. This operation was repeated three times, and then the cake, about 500 g of ion-exchanged water, and 5 g of acetic acid was placed in the autoclave equipped with an agitator. The autoclave was purged with nitrogen and then heated to 195° C. Thereafter, the autoclave was cooled, and the contents were taken out. The contents were filtered through a filter to give a cake. The cake obtained was dried under a stream of nitrogen at 120° C. to yield a dry PPS.

The GPC measurement showed that the polyphenylene sulfide obtained had a weight average molecular weight of 18,000, a number average molecular weight of 6,300, and a polydispersity of 2.86. The carboxyl group content per mole of polyphenylene sulfide structural unit was 1.16 mol %.

Reference Example 9 (Method of Producing Aromatic Polyester (B))

Dimethyl terephthalate in an amount of 100 parts by weight, ethylene glycol in an amount of 60 parts by weight, and magnesium acetate in an amount of 0.05 mmol (in terms of magnesium atoms) based on 100 g of the polymer to be obtained were melted at 150° C. in a nitrogen atmosphere. The resulting mixture was then heated to 240° C. over 4 hours with stirring to distill out methanol, thereby promoting the transesterification reaction to produce bis(hydroxyethyl) terephthalate (BHT).

The BHT was introduced into a test tube and retained in the molten state at 250° C., and then antimony trioxide in an amount of 0.2 mmol (in terms of antimony atoms) based on 100 g of the polymer to be obtained and trimethyl phosphate in an amount of 0.1 mmol (in terms of phosphorus atoms) based on 100 g of the polymer to be obtained were added. The reaction was started 5 minutes after the compounds were introduced. The reactor was gradually heated from 250° C. to 290° C. over 60 minutes, while the pressure was reduced from normal pressure to 40 Pa over 60 minutes. At 290° C. and 40 Pa, the polymerization reaction was carried out for 200 minutes. After completion of the polymerization reaction, the melt was discharged in strand form, cooled, and then immediately cut to give polyethylene terephthalate pellets. The intrinsic viscosity of the polyethylene terephthalate obtained was measured to be 0.69 dL/g.

Example 1

Into a test tube equipped with an agitator, a vacuum stirrer, and a nitrogen inlet tube, 5.0 g of a polyphenylene sulfide (A) produced by the method described in Reference Example 2, 5.0 g of a polyethylene terephthalate produced by the method described in Reference Example 9, and 0.01 g of titanium(IV) butoxide were weighed. The test tube was sealed under nitrogen and purged with nitrogen three times, and then the pressure in the system was reduced (to 2.4 kPa).

The test tube, under stirring, was placed in an oil bath conditioned in advance at 290° C. to start the reaction, and the reaction was carried out under the following temperature conditions: hold at 290° C. for 15 minutes, increase from 290° C. to 300° C. over 15 minutes, and hold at 300° C. for 120 minutes. After completion of the reaction, the test tube was rapidly cooled to recover a product, thereby obtaining a polyphenylene sulfide block copolymer.

The polyphenylene sulfide block copolymer obtained was subjected to GPC measurement to show that the chromatogram was unimodal, and the copolymer had a weight average molecular weight of 68,000 and a number average molecular weight of 30,000, demonstrating that the polyphenylene sulfide used in the reaction was copolymerized to have a high molecular weight.

Into a flask equipped with a condenser, 0.5 g of the polyphenylene sulfide block copolymer (pulverized) and 6.0 g of 1,1,1,3,3,3-hexafluoroisopropanol (HFIP) were weighed. Using an oil bath at 50° C., the flask was heated under stirring for 3 hours to elute unreacted polyethylene terephthalate remaining in the block copolymer into HFIP. After the heating under stirring for 3 hours, hot filtration was performed using a glass filter with an average mesh opening of 10 to 16 μm to separate the mixture into HFIP-soluble components and HFIP-insoluble components, and these components were recovered. The HFIP-soluble components, after HFIP had been removed using an evaporator, were dried overnight under vacuum at 80° C. together with the HFIP-insoluble components to yield dry solids. The dry solids obtained were each weighed, and the weight fraction of the HFIP-soluble components was calculated to be 4.5% by weight, meaning that the amount of unreacted polyethylene terephthalate in the block copolymer obtained here was 4.5% by weight.

Furthermore, to determine the molecular chain length of the polyphenylene sulfide segment constituting the polyphenylene sulfide block copolymer, the polyphenylene sulfide segment was alkali treated. Into a flask equipped with a condenser, 0.5 g of the polyphenylene sulfide block copolymer (pulverized) and 50 g of a 7N aqueous sodium hydroxide solution were weighed. Using an oil bath at 50° C., the flask was heated under stirring for 24 hours to cause alkaline degradation of the polyphenylene sulfide segment. After completion of the reaction, a solid was recovered using a glass filter with an average mesh opening of 10 to 16 μm. The solid was rinsed with deionized water and then dried overnight under vacuum at 100° C. to recover a dry solid. The solid recovered was subjected to GPC measurement and shown to have a weight average molecular weight of 49,000, a number average molecular weight of 24,000, and a polydispersity of 2.05. This indicates that the polyphenylene sulfide segment constituting the polyphenylene sulfide block copolymer has a number average molecular weight of 6,000 or more. The surface and cross-section of the solid were observed under a scanning electron microscope, and a porous structure was observed.

Example 2

Into a test tube equipped with an agitator, a vacuum stirrer, and a nitrogen inlet tube, 5.0 g of a polyphenylene sulfide (A) produced by the method described in Reference Example 3, 5.0 g of a polyethylene terephthalate produced by the method described in Reference Example 9, and 0.02 g of antimony trioxide were weighed. The test tube was sealed under nitrogen and purged with nitrogen three times, and then the pressure in the system was reduced (to 2.0 kPa).

The test tube, under stirring, was placed in an oil bath conditioned in advance at 290° C. to start the reaction, and the reaction was carried out under the following temperature conditions: hold at 290° C. for 15 minutes, increase from 290° C. to 300° C. over 15 minutes, and hold at 300° C. for 120 minutes. After completion of the reaction, the test tube was rapidly cooled to recover a product, thereby obtaining a polyphenylene sulfide block copolymer.

The polyphenylene sulfide block copolymer obtained was subjected to GPC measurement to show that the chromatogram was unimodal, and the copolymer had a weight average molecular weight of 49,000 and a number average molecular weight of 23,000, demonstrating that the polyphenylene sulfide used in the reaction was copolymerized to have a high molecular weight.

The thermal HFIP extraction was carried out in the same manner as in Example 1 to show that the amount of unreacted polyethylene terephthalate in the polyphenylene sulfide block copolymer obtained was 4.0% by weight.

Furthermore, to determine the molecular chain length of the polyphenylene sulfide segment constituting the polyphenylene sulfide block copolymer, the block copolymer was alkali treated in the same manner as in Example 1 to recover a solid. The solid obtained was subjected to GPC measurement and shown to have a weight average molecular weight of 26,000, a number average molecular weight of 16,000, and a polydispersity of 1.62. This indicates that the polyphenylene sulfide segment constituting the polyphenylene sulfide block copolymer has a number average molecular weight of 6,000 or more. The surface and cross-section of the solid were observed under a scanning electron microscope, and a porous structure was observed.

Example 3

Into a test tube equipped with an agitator, a vacuum stirrer, and a nitrogen inlet tube, 5.0 g of a polyphenylene sulfide (A) produced by the method described in Reference Example 4, 5.0 g of a polyethylene terephthalate produced by the method described in Reference Example 9, and 0.01 g of titanium(IV) butoxide were weighed. The test tube was sealed under nitrogen and purged with nitrogen three times, and then the pressure in the system was reduced (to 2.3 kPa).

The test tube, under stirring, was placed in an oil bath conditioned in advance at 290° C. to start the reaction, and the reaction was carried out under the following temperature conditions: hold at 290° C. for 15 minutes, increase from 290° C. to 300° C. over 15 minutes, and hold at 300° C. for 120 minutes. After completion of the reaction, the test tube was rapidly cooled to recover a product, thereby obtaining a polyphenylene sulfide block copolymer.

The polyphenylene sulfide block copolymer obtained was subjected to GPC measurement to show that the chromatogram was unimodal, and the copolymer had a weight average molecular weight of 61,000 and a number average molecular weight of 28,000, demonstrating that the polyphenylene sulfide used in the reaction was copolymerized to have a high molecular weight.

The thermal HFIP extraction was carried out in the same manner as in Example 1 to show that the amount of unreacted polyethylene terephthalate in the polyphenylene sulfide block copolymer obtained was 8.8% by weight.

Furthermore, to determine the molecular chain length of the polyphenylene sulfide segment constituting the polyphenylene sulfide block copolymer, the block copolymer was alkali treated in the same manner as in Example 1 to recover a solid. The solid obtained was subjected to GPC measurement and shown to have a weight average molecular weight of 41,000, a number average molecular weight of 20,000, and a polydispersity of 2.08. This indicates that the polyphenylene sulfide segment constituting the polyphenylene sulfide block copolymer has a number average molecular weight of 6,000 or more. The surface and cross-section of the solid were observed under a scanning electron microscope, and a porous structure was observed.

Example 4

Into a test tube equipped with an agitator, a vacuum stirrer, and a nitrogen inlet tube, 5.0 g of a polyphenylene sulfide (A) produced by the method described in Reference Example 5, 5.0 g of a polyethylene terephthalate produced by the method described in Reference Example 9, and 0.01 g of titanium(IV) butoxide were weighed. The test tube was sealed under nitrogen and purged with nitrogen three times, and then the pressure in the system was reduced (to 2.0 kPa).

The test tube, under stirring, was placed in an oil bath conditioned in advance at 290° C. to start the reaction, and the reaction was carried out under the following temperature conditions: hold at 290° C. for 15 minutes, increase from 290° C. to 300° C. over 15 minutes, and hold at 300° C. for 120 minutes. After completion of the reaction, the test tube was rapidly cooled to recover a product, thereby obtaining a polyphenylene sulfide block copolymer.

The polyphenylene sulfide block copolymer obtained was subjected to GPC measurement to show that the chromatogram was unimodal, and the copolymer had a weight average molecular weight of 65,000 and a number average molecular weight of 27,000, demonstrating that the polyphenylene sulfide used in the reaction was copolymerized to have a high molecular weight.

The thermal HFIP extraction was carried out in the same manner as in Example 1 to show that the amount of unreacted polyethylene terephthalate in the polyphenylene sulfide block copolymer obtained was 2.6% by weight.

Furthermore, to determine the molecular chain length of the polyphenylene sulfide segment constituting the polyphenylene sulfide block copolymer, the block copolymer was alkali treated in the same manner as in Example 1 to recover a solid. The solid obtained was subjected to GPC measurement and shown to have a weight average molecular weight of 35,000, a number average molecular weight of 17,000, and a polydispersity of 2.06. This indicates that the polyphenylene sulfide segment constituting the polyphenylene sulfide block copolymer has a number average molecular weight of 6,000 or more. The surface and cross-section of the solid were observed under a scanning electron microscope, and a porous structure was observed. Examples 3 and 4 indicate that regardless of the terminal functional group of the polyphenylene sulfide (A), the reaction between the polyphenylene sulfide (A) and the aromatic polyester (B) proceeds to form a polyphenylene sulfide block copolymer.

Comparative Example 1

Into a test tube equipped with an agitator, a vacuum stirrer, and a nitrogen inlet tube, 5.0 g of a general-purpose polyphenylene sulfide produced by the method described in Reference Example 7, 5.0 g of a polyethylene terephthalate produced by the method described in Reference Example 9, and 0.01 g of titanium(IV) butoxide were weighed. The test tube was sealed under nitrogen and purged with nitrogen three times, and then the pressure in the system was reduced (to 1.9 kPa).

The test tube, under stirring, was placed in an oil bath conditioned in advance at 290° C. to start the reaction, and the reaction was carried out under the following temperature conditions: hold at 290° C. for 15 minutes, increase from 290° C. to 300° C. over 15 minutes, and hold at 300° C. for 120 minutes. After completion of the reaction, the test tube was rapidly cooled to recover a product.

The polyphenylene sulfide block copolymer obtained was subjected to GPC measurement and shown to have a weight average molecular weight of 48,000 and a number average molecular weight of 15,000, demonstrating that the molecular weight of the polyphenylene sulfide used in the reaction did not increase.

Similarly to Example 1, unreacted polyethylene terephthalate in the resulting product was analyzed by thermal HFIP extraction to show that the amount of HFIP-soluble component was 50% by weight (the whole amount of the polyethylene terephthalate used in the reaction was eluted).

This result shows that when a polyphenylene sulfide having no reactive functional end group is used as a material, the reaction with an aromatic polyester does not proceed, and a block copolymer is not formed.

Example 5

Into a test tube equipped with an agitator, a vacuum stirrer, and a nitrogen inlet tube, 5.0 g of a polyphenylene sulfide (A) produced by the method described in Reference Example 6, 5.0 g of a polyethylene terephthalate produced by the method described in Reference Example 9, and 0.01 g of titanium(IV) butoxide were weighed. The test tube was sealed under nitrogen and purged with nitrogen three times, and then the pressure in the system was reduced (to 2.1 kPa).

The test tube, under stirring, was placed in an oil bath conditioned in advance at 290° C. to start the reaction, and the reaction was carried out under the following temperature conditions: hold at 290° C. for 15 minutes, increase from 290° C. to 300° C. over 15 minutes, and hold at 300° C. for 120 minutes. After completion of the reaction, the test tube was rapidly cooled to recover a product, thereby obtaining a polyphenylene sulfide block copolymer.

The polyphenylene sulfide block copolymer obtained was subjected to GPC measurement to show that the chromatogram was unimodal, and the copolymer had a weight average molecular weight of 40,000 and a number average molecular weight of 16,000, demonstrating that the polyphenylene sulfide used in the reaction was copolymerized to have a high molecular weight.

The thermal HFIP extraction was carried out in the same manner as in Example 1 to show that the amount of unreacted polyethylene terephthalate in the polyphenylene sulfide block copolymer obtained was 2.5% by weight.

Furthermore, to determine the molecular chain length of the polyphenylene sulfide segment constituting the polyphenylene sulfide block copolymer, the block copolymer was alkali treated in the same manner as in Example 1 to recover a solid. The solid obtained was subjected to GPC measurement and shown to have a weight average molecular weight of 17,000, a number average molecular weight of 6,500, and a polydispersity of 2.62. This indicates that the polyphenylene sulfide segment constituting the polyphenylene sulfide segment copolymer has a number average molecular weight of 6,000 or more. The surface and cross-section of the solid were observed under a scanning electron microscope, and a porous structure was observed.

Example 6

Into a test tube equipped with an agitator, a vacuum stirrer, and a nitrogen inlet tube, 5.0 g of a polyphenylene sulfide (A) produced by the method described in Reference Example 8, 5.0 g of a polyethylene terephthalate produced by the method described in Reference Example 6, and 0.01 g of titanium(IV) butoxide were weighed. The test tube was sealed under nitrogen and purged with nitrogen three times, and then the pressure in the system was reduced (to 1.7 kPa).

The test tube, under stirring, was placed in an oil bath conditioned in advance at 290° C. to start the reaction, and the reaction was carried out under the following temperature conditions: hold at 290° C. for 15 minutes, increase from 290° C. to 300° C. over 15 minutes, and hold at 300° C. for 120 minutes. After completion of the reaction, the test tube was rapidly cooled to recover a product, thereby obtaining a polyphenylene sulfide block copolymer.

The polyphenylene sulfide block copolymer obtained was subjected to GPC measurement to show that the chromatogram was unimodal, and the copolymer had a weight average molecular weight of 60,000 and a number average molecular weight of 18,000, demonstrating that the polyphenylene sulfide used in the reaction was copolymerized to have a high molecular weight.

The thermal HFIP extraction was carried out in the same manner as in Example 1 to show that the amount of unreacted polyethylene terephthalate in the polyphenylene sulfide block copolymer obtained was 2.4% by weight.

Furthermore, to determine the molecular chain length of the polyphenylene sulfide segment constituting the polyphenylene sulfide block copolymer, the block copolymer was alkali treated in the same manner as in Example 1 to recover a solid. The solid obtained was subjected to GPC measurement and shown to have a weight average molecular weight of 18,000, a number average molecular weight of 6,300, and a polydispersity of 2.86. This indicates that the polyphenylene sulfide segment constituting the polyphenylene sulfide block copolymer has a number average molecular weight of 6,000 or more. The surface and cross-section of the solid were observed under a scanning electron microscope, and a porous structure was observed.

The above results show that regardless of the method of synthesizing the polyphenylene sulfide (A), block copolymerization with an aromatic polyester proceeds through the use of a polyphenylene sulfide having a reactive end group.

Example 7

Into a test tube equipped with an agitator, a vacuum stirrer, and a nitrogen inlet tube, 5.0 g of a polyphenylene sulfide (A) produced by the method described in Reference Example 6 and 5.0 g of a polyethylene terephthalate produced by the method described in Reference Example 6 were weighed. The test tube was sealed under nitrogen and purged with nitrogen three times, and then the pressure in the system was reduced (to 1.9 kPa).

The test tube, under stirring, was placed in an oil bath conditioned in advance at 290° C. to start the reaction, and the reaction was carried out under the following temperature conditions: hold at 290° C. for 15 minutes, increase from 290° C. to 300° C. over 15 minutes, and hold at 300° C. for 120 minutes. After completion of the reaction, the test tube was rapidly cooled to recover a product, thereby obtaining a polyphenylene sulfide block copolymer.

The polyphenylene sulfide block copolymer obtained was subjected to GPC measurement to show that the chromatogram was unimodal, and the copolymer had a weight average molecular weight of 38,000 and a number average molecular weight of 12,000, demonstrating that the polyphenylene sulfide used in the reaction was copolymerized to have a high molecular weight.

The thermal HFIP extraction was carried out in the same manner as in Example 1 to show that the amount of unreacted polyethylene terephthalate in the polyphenylene sulfide block copolymer obtained was 5.2% by weight.

Furthermore, to determine the molecular chain length of the polyphenylene sulfide segment constituting the polyphenylene sulfide block copolymer, the block copolymer was alkali treated in the same manner as in Example 1 to recover a solid. The solid obtained was subjected to GPC measurement and shown to have a weight average molecular weight of 17,000, a number average molecular weight of 6,500, and a polydispersity of 2.62. This indicates that the polyphenylene sulfide segment constituting the polyphenylene sulfide block copolymer has a number average molecular weight of 6,000 or more. The surface and cross-section of the solid were observed under a scanning electron microscope, and a porous structure was observed.

The above results show that block copolymerization proceeds even if no catalyst is added when the polyphenylene sulfide (A) and the aromatic polyester are heated.

The polyphenylene sulfide block copolymer having excellent heat resistance and chemical resistance according to the present invention can be molded by injection molding and extrusion molding into various molded parts such as films, sheets, and fibers and can be widely used in the fields of various electrical and electronic components, machine parts, automotive parts, and other parts requiring heat resistance and chemical resistance. Polyphenylene sulfide porous media produced by the method of the present invention can be used for various separation membranes.

The invention claimed is:
1. A method of producing a polyphenylene sulfide block copolymer comprising:
  polyphenylene sulfide units represented by Formula (I); and
  aromatic polyester units represented by Formula (II),
  wherein the polyphenylene sulfide units have a number average molecular weight (Mn) in the range of 6,000 to 100,000;

[Formula 1]

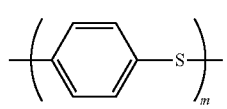
(I)

[Formula 2]

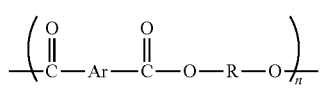
(II)

wherein Ar represents an optionally substituted arylene group of 6 to 20 carbon atoms, and R represents a divalent aliphatic hydrocarbon group of 1 to 10 carbon atoms, the method comprising heating a polyphenylene sulfide (A) comprising the polyphenylene sulfide represented by Formula (I) as a repeating structure and an aromatic polyester (B) consisting of the polyester represented by Formula (II) as a repeating structure, wherein the polyphenylene sulfide block copolymer which is produced has a weight fraction of 1,1,1,3,3,3-hexafluoroisopropanol-soluble components which is not less than 2.4% by weight and not more than 5.2% by weight.

2. The method of producing the polyphenylene sulfide block copolymer according to claim 1, wherein the polyphenylene sulfide (A) is a polyphenylene sulfide represented by Formula (III):

[Formula 3]

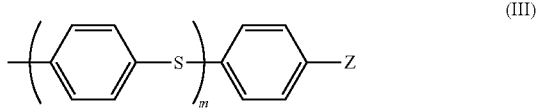

(III)

having a reactive end structure Z, wherein the reactive end structure Z is a reactive functional group end structure selected from amino, carboxyl, hydroxyl, acid anhydride, isocyanate, epoxy, silanol, and alkoxysilane groups, and derivatives thereof.

3. The method of producing the polyphenylene sulfide block copolymer according to claim 1, wherein the polyphenylene sulfide (A) is a polyphenylene sulfide produced by heating a cyclic polyphenylene sulfide (a) in the presence of a sulfide compound represented by Formula (IV) having reactive functional groups in an amount of 0.01 mol % to 25 mol % per mole of phenylene sulfide structural units:

[Formula 4]

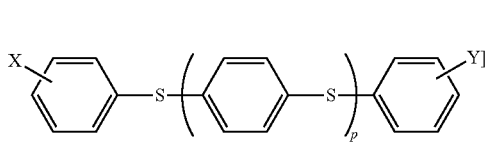

(IV)

wherein at least one of X and Y is a functional group selected from amino, carboxyl, hydroxyl, acid anhydride, isocyanate, epoxy, silanol, and alkoxysilane groups, and derivatives thereof, and p represents an integer of 0 to 20, provided that p may be a single integer or a combination of different integers.

4. The method of producing the polyphenylene sulfide block copolymer according to claim 3, wherein the cyclic polyphenylene sulfide (a) is a monomer or mixture comprising 50% by weight or more of a cyclic polyphenylene sulfide represented by Formula (V):

[Formula 5]

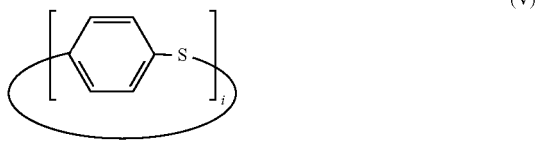

(V)

wherein i is from 4 to 50.

5. The method of producing the polyphenylene sulfide block copolymer according to claim 3, wherein the polyphenylene sulfide (A) is a polyphenylene sulfide produced by heating a mixture comprising the cyclic polyphenylene sulfide (a) and the sulfide compound having reactive functional groups in the absence of a solvent.

6. The method of producing the polyphenylene sulfide block copolymer according to claim 3, wherein the reactive functional groups in the sulfide compound having reactive functional groups are functional groups selected from amino, carboxyl, and hydroxyl groups.

7. The method of producing the polyphenylene sulfide block copolymer according to claim 1, wherein the polyphenylene sulfide (A) is a polyphenylene sulfide produced by heating a mixture comprising (i) a sulfidizing agent, (ii) a dihalogenated aromatic compound, (iii) an organic polar solvent, and (iv) a monohalogenated compound having a reactive functional group W represented by Formula (VI), the amount of the monohalogenated compound being 0.01 to 10 mol % per mole of the dihalogenated aromatic compound:

[Formula 6]

(VI)

wherein V represents a halogen.

8. The method of producing the polyphenylene sulfide block copolymer according to claim 1, wherein the polyphenylene sulfide (A) is a polyphenylene sulfide produced by heating and reacting a mixture comprising a polyphenylene sulfide, an organic polar solvent, and a sulfidizing agent in an amount of less than 2 mol % per mole of the repeating unit of the polyphenylene sulfide represented by Formula (VII):

[Formula 7]

(VII)

to give a reaction mixture, adding to the reaction mixture the monohalogenated compound having a reactive functional group represented by Formula (VI) in an amount of 1.0 to 10 moles per mole of the sulfidizing agent, and heating the resulting mixture.

9. The method of producing the polyphenylene sulfide block copolymer according to claim 7, wherein the reactive functional group W is a functional group selected from amino, carboxyl, and hydroxyl groups.

10. A method of producing a polyphenylene sulfide porous media, comprising decomposing and removing the aromatic polyester (B) from a polyphenylene sulfide block copolymer produced by the production method according to claim 1.

* * * * *